United States Patent
Ohno

(10) Patent No.: US 8,934,054 B2
(45) Date of Patent: Jan. 13, 2015

(54) FRAME RATE CONVERSION PROCESSING APPARATUS, FRAME RATE CONVERSION PROCESSING METHOD, AND STORAGE MEDIUM

(75) Inventor: Takenori Ohno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 13/039,712

(22) Filed: Mar. 3, 2011

(65) Prior Publication Data

US 2011/0216240 A1 Sep. 8, 2011

(30) Foreign Application Priority Data

Mar. 5, 2010 (JP) .................................. 2010-049314

(51) Int. Cl.
H04N 7/01 (2006.01)

(52) U.S. Cl.
CPC ........................................ *H04N 7/01* (2013.01)
USPC ............................ 348/441; 348/452; 348/451

(58) Field of Classification Search
CPC .................................................... H04N 7/0127
See application file for complete search history.

(56) References Cited

U.S. PATENT DOCUMENTS

| 8,194,735 B2* | 6/2012 | Matsumura et al. ..... 375/240.03 |
| 2007/0273787 A1* | 11/2007 | Ogino et al. .................. 348/441 |
| 2008/0292006 A1* | 11/2008 | Dumitras et al. ........ 375/240.29 |
| 2011/0141372 A1* | 6/2011 | Kato et al. .................... 348/700 |

FOREIGN PATENT DOCUMENTS

JP 2003-069961 A 3/2003

* cited by examiner

*Primary Examiner* — Jeffrey Harold
*Assistant Examiner* — Samira Monshi
(74) *Attorney, Agent, or Firm* — Canon U.S.A., Inc. IP Division

(57) ABSTRACT

A frame rate conversion processing system can generate a second row of frames that is different from a first row of frames in the number of frames. The frame rate conversion processing system includes a luminance change detection unit configured to calculate a luminance change value of the first row of frames based on luminance changes in the entire area or a partial area of the frames that constitutes the first row of frames and configured to compare the calculated luminance change value with a predetermined value. The frame rate conversion processing system further includes a correction unit configured to correct the luminance of the entire area or a partial area of the frames that constitutes the second row of frames according to a comparison result obtained by the luminance change detection unit.

16 Claims, 20 Drawing Sheets

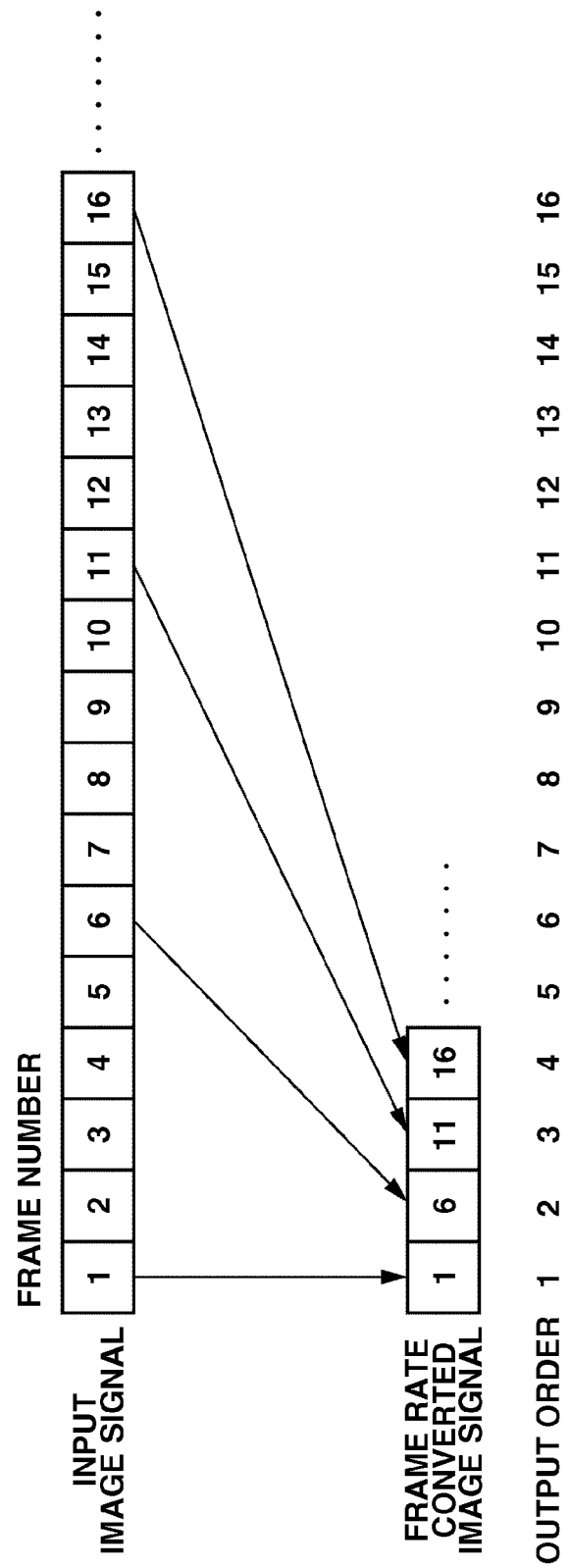

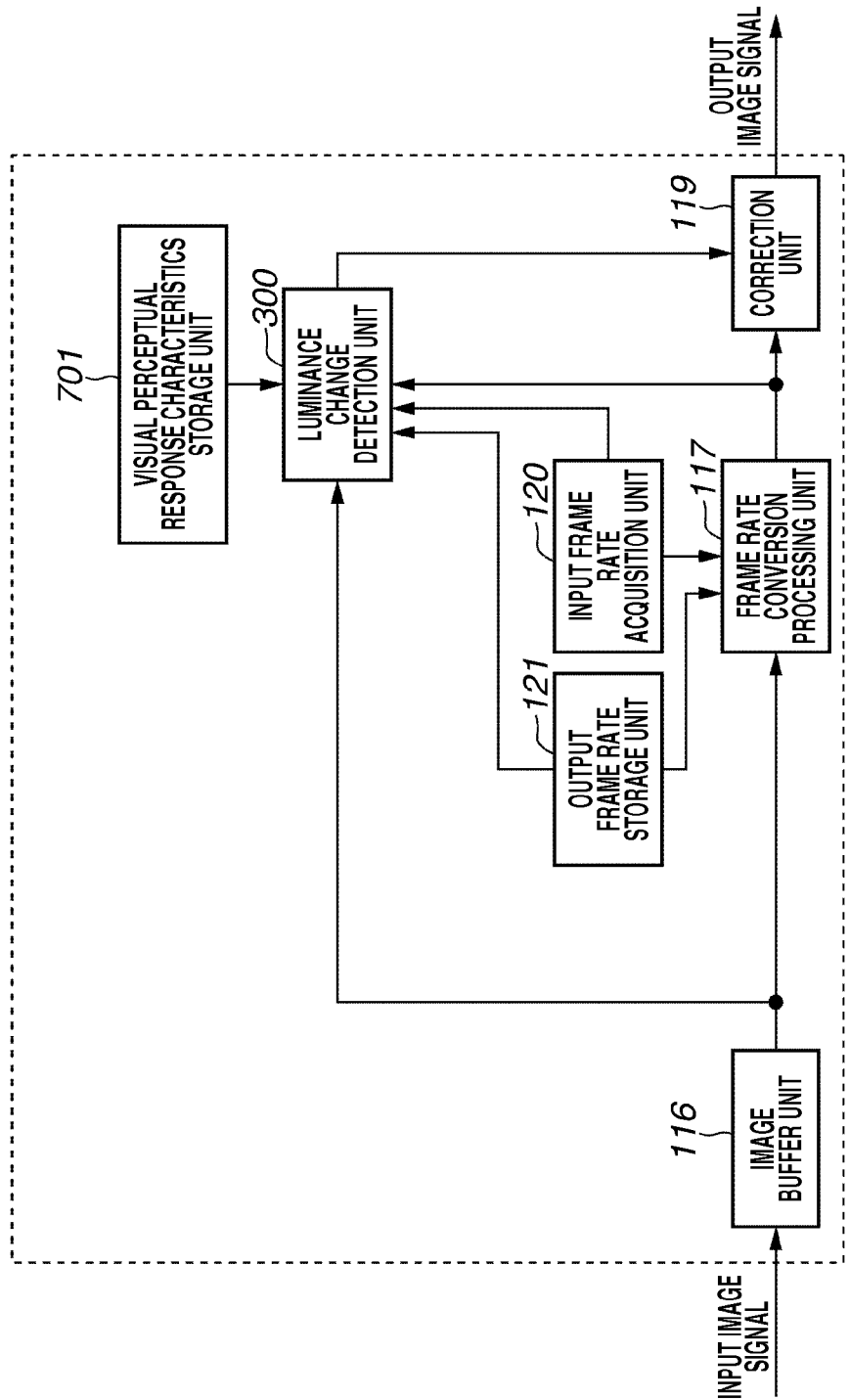

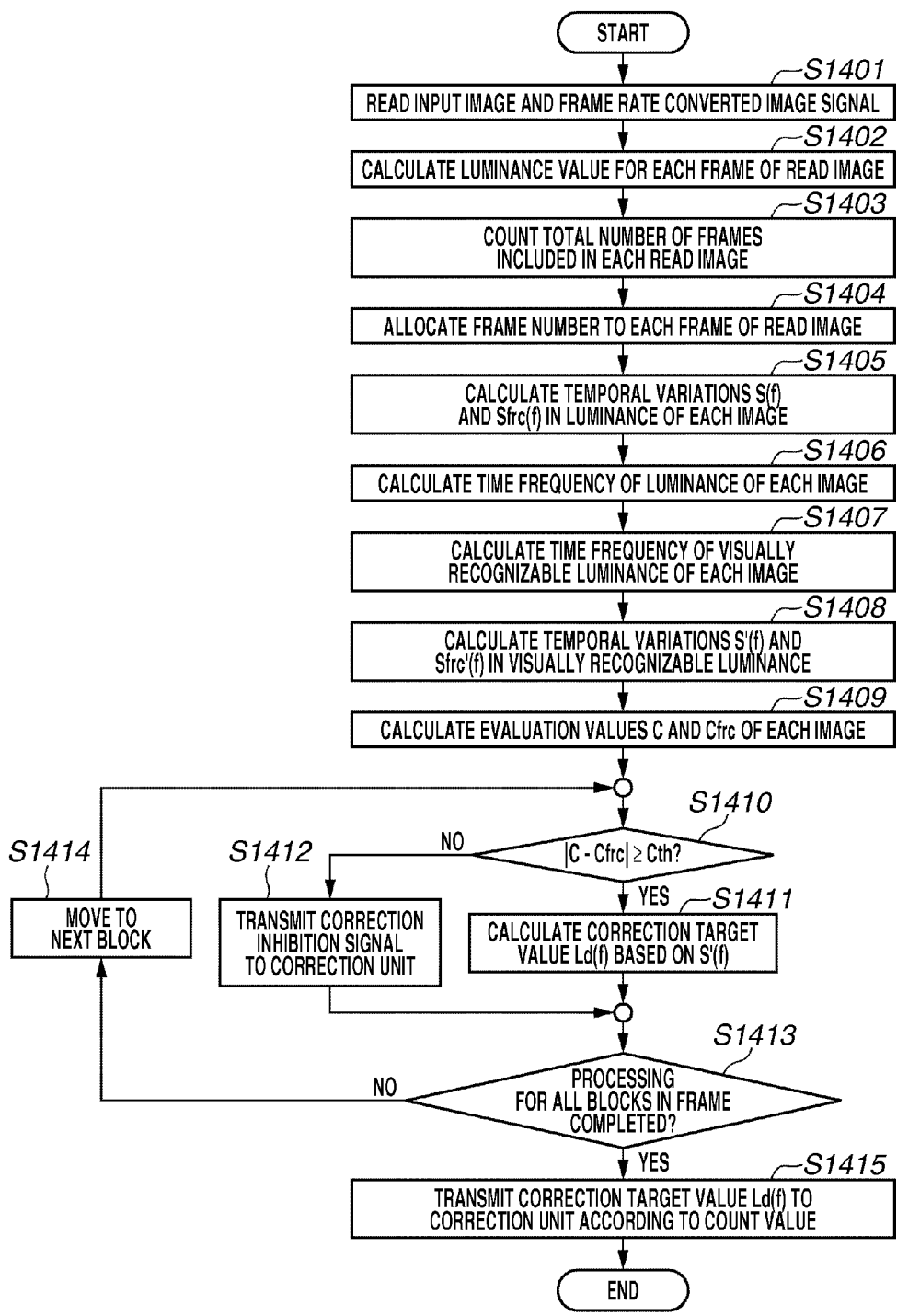

FRAME RATE CONVERSION PROCESSING APPARATUS, FRAME RATE CONVERSION PROCESSING METHOD, AND STORAGE MEDIUM

BACKGROUND OF THE INVENTION

1. Field of the Invention

The present invention relates to a frame rate conversion processing apparatus that changes a frame rate of a first image signal to generate a second image signal, a frame rate conversion processing method, and a program.

2. Description of the Related Art

In the frame rate conversion for a video, it is conventionally feasible to prevent a converted video from becoming visually unnatural. For example, to perform the frame rate conversion, a conventional technique discussed in Japanese Patent Application Laid-Open No. 2003-069961 includes processing for generating predicted frame data based on a pre-conversion frame rate, a post-conversion frame rate, and a motion vector of the frame, inserting a predicted frame between frames of a pre-conversion video, and interpolating the motion of a subject to be captured in the video.

Further, there is an advanced imaging apparatus that can generate a higher frame rate video. However, if a video output apparatus represented by a television set cannot display a higher frame rate video, it is generally necessary to convert (reduce) the frame rate of an input video in advance so that the apparatus can display the input video.

In such a case, a video having been subjected to the frame rate conversion processing may become visually unnatural due to forcible reduction of the frame rate.

For example, there is an object that can be recognized as stably emitting light because temporal changes in luminance occur at a very high frequency and cannot be perceived by human eyes. If the frame rate of a video is changed, the above-described object may be recognized as temporally changing in luminance in a converted video.

FIGS. 16A and 16B illustrate an example of the frame rate conversion. An upper part of FIG. 16A illustrates temporal changes in luminance of fluorescent lighting in a case where the frequency of a power source is 50 Hz. The fluorescent lighting causes luminance changes at the frequency of 100 Hz, which is two times the frequency of the power source.

A lower part of FIG. 16A illustrates a row of frames that are successively arranged according to the order of image capturing processing performed at the rate of 300 frames per second. As apparent from the illustrated row of frames, the brightness of the fluorescent lighting periodically decreases (becomes dark) at intervals of 1/100 sec.

If the above-described row of frames is reproduced at 300 fps (i.e., 300 frames per second), the brightness of the fluorescent lighting causes luminance changes at the frequency of 100 Hz. However, it is generally known that the time frequency at which temporal changes in luminance cannot be visually recognized by human eyes is equal to or greater than 60 Hz. The light of fluorescent lighting recognized by human eyes is the light constantly maintaining predetermined brightness (hereinafter, referred to as "stable light").

An example conversion of the frame rate from 300 Hz to 60 Hz is described below with reference to the lower part of FIG. 16A and FIG. 16B, according to which a new row of frames can be generated by successively extracting one frame at intervals of 1/60 sec from the above-described row of frames.

More specifically, the lower part of FIG. 16A illustrates a row of frames that is not yet subjected to the frame rate conversion processing. FIG. 16B illustrates a row of frames obtained through the frame rate conversion processing. When the row of frames illustrated in the FIG. 16B is reproduced at 60 fps, the luminance of the fluorescent lighting in a reproduced video changes at the frequency of 20 Hz as illustrated in FIG. 16B. More specifically, the temporal changes in luminance occur at intervals of 1/20 sec and therefore the changes in luminance of the fluorescent lighting can be perceived by human eyes.

Therefore, even when the above-described conventional technique is employed to generate a predicted frame that interpolates a motion and insert the generated predicted frame between frames, an object to be visually recognized as stable light may be erroneously recognized as temporally changing in luminance in a frame rate converted video, as described above.

SUMMARY OF THE INVENTION

The present invention is directed to a frame rate conversion processing apparatus and a frame rate conversion processing method, which can prevent a video having been subjected to frame rate conversion processing from becoming visually unnatural.

An aspect of the present invention provides a first frame rate conversion processing apparatus that converts an input image signal having a first frame rate into an output image signal having a second frame rate, in which the second frame rate is lower than the first frame rate. The first frame rate conversion processing apparatus includes a detection unit configured to detect temporal changes in luminance of the input image signal and a generation unit configured to generate the output image signal based on the input image signal so that the output image signal does not include the temporal changes in luminance that can be perceived by human eyes and corresponding to the temporal changes detected by the detection unit if the detection unit detects the temporal changes of a frequency that exceeds a predetermined frequency of temporal changes in luminance that can be perceived by human eyes.

Another aspect of the present invention provides a second frame rate conversion processing apparatus that converts an input image signal having a first frame rate into a frame rate converted image signal having a second frame rate, in which the second frame rate is lower than the first frame rate, and then generates an output image signal having the second frame rate based on the frame rate converted image signal. The second frame rate conversion processing apparatus includes a first acquisition unit configured to acquire an evaluation value for the input image signal, which can be calculated based on a frequency that represents temporal changes in luminance of the input image signal and visual perceptual response characteristics, a second acquisition unit configured to acquire an evaluation value for the frame rate converted image signal, which can be calculated based on a frequency that represents temporal changes in luminance of the frame rate converted image signal and the visual perceptual response characteristics, a third acquisition unit configured to acquire a frequency that represents temporal changes in luminance, which can be obtained by filtering the frequency that represents temporal changes in luminance of the input image signal using the visual perceptual response characteristics, a comparison unit configured to compare a difference between the evaluation value acquired by the first acquisition unit and the evaluation value acquired by the second acquisition unit with a predetermined value, and a generation unit configured to generate the output image signal by correcting the frame rate converted image signal using the filtered frequency that represents temporal changes in luminance acquired by the third acquisition unit, as a correction target value of the frequency that represents temporal changes in luminance, if the comparison unit determines that the difference exceeds the predetermined value.

Further, another aspect of the present invention provides a third frame rate conversion processing apparatus that converts an input image signal having a first frame rate into an output image signal having a second frame rate, in which the second frame rate is lower than the first frame rate. The third frame rate conversion processing apparatus includes a filtering unit configured to filter a frequency that represents temporal changes in luminance of the input image signal using visual perceptual response characteristics, a correction unit configured to correct the luminance of the input image signal using the frequency that represents temporal changes in luminance, which can be obtained through the filtering performed by the filtering unit to filter the frequency that represents temporal changes in luminance of the input image signal, as a correction target value of the frequency that represents temporal changes in luminance, and a conversion unit configured to convert the input image signal corrected by the correction unit into the output image signal having the second frame rate.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a temporal relationship between an input image signal and a frame rate converted image signal in frame rate conversion processing according to the first exemplary embodiment of the present invention.

FIG. 7A is a block diagram illustrating a configuration of a frame rate conversion processing apparatus according to a second exemplary embodiment of the present invention.

FIG. 14 is a flowchart illustrating luminance change detection processing according to the third exemplary embodiment of the present invention.

DESCRIPTION OF THE EMBODIMENTS

Various exemplary embodiments, features, and aspects of the invention will be described in detail below with reference to the drawings.

Figure 1A:
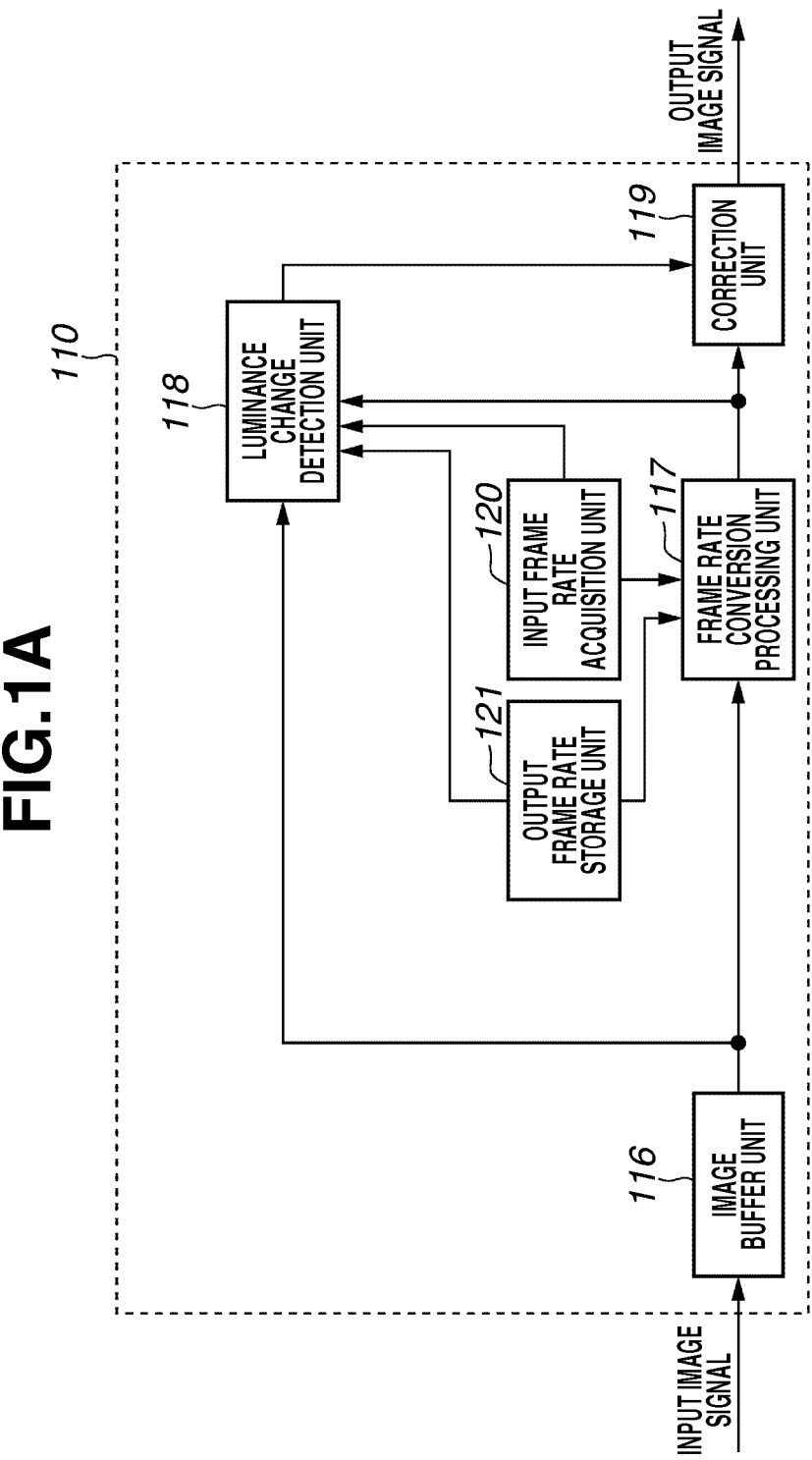
FIG. 1A is a block diagram illustrating a configuration of a frame rate conversion processing apparatus according to a first exemplary embodiment of the present invention.

First, an example configuration of a frame rate conversion processing apparatus 110 according to the first exemplary embodiment of the present invention is described below with reference to FIG. 1A.

The frame rate conversion processing apparatus 110 can convert a frame rate of an image signal received via an input terminal thereof (hereinafter, referred to as "input image signal"), perform correction processing on a frame rate converted image signal, and output a correction processing completed image signal (hereinafter, referred to as "output image signal").

The frame rate conversion processing apparatus 110 includes an image buffer unit 116 that can temporarily store an input image signal on frame-by-frame basis. The image buffer unit 116 can transmit a temporarily stored input image signal, according to a reading command, to a frame rate conversion processing unit 117 and a luminance change detection unit 118.

The frame rate conversion processing unit 117 can perform thinning and interpolation processing on frames of an input image signal read from the image buffer unit 116 so as to equalize the frame rate of the input image signal read from the image buffer unit 116 with a frame rate of the output image signal.

The luminance change detection unit 118 can calculate and acquire a frequency that represents temporal changes in luminance of an input image signal read from the image buffer unit 116. Further, the luminance change detection unit 118 can calculate and acquire a frequency that represents temporal changes in luminance based on a frame rate conversion completed image signal received from the frame rate conversion processing unit 117 (hereinafter, referred to as "frame rate converted image signal").

Then, the luminance change detection unit 118 compares an acquired frequency that represents temporal changes in luminance with a predetermined frequency that represents temporal changes in luminance and determines a correction target value of the frame rate converted image signal based on a comparison result. Then, the luminance change detection unit 118 causes a correction unit 119 to perform correction processing.

Figure 1B:
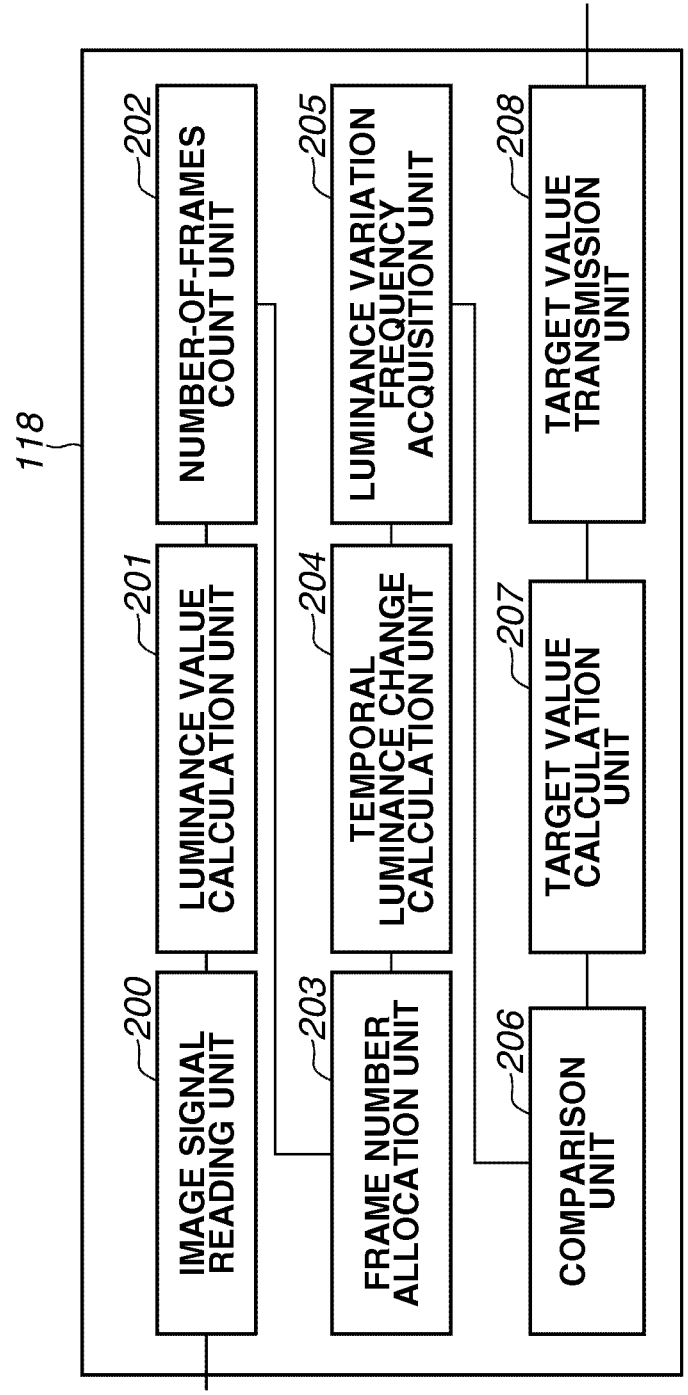
FIG. 1B is a functional block diagram illustrating a luminance change detection unit according to the first exemplary embodiment of the present invention.

FIG. 1B is a functional block diagram illustrating the luminance change detection unit 118. A processor and a memory, which are built in the luminance change detection unit 118, can cooperatively realize each functional block illustrated in FIG. 1B.

More specifically, the processor built in the luminance change detection unit 118 is a computer that can execute a program loaded from the memory built in the luminance change detection unit 118. The memory built in the luminance change detection unit 118 is a storage medium capable of storing the program that the processor can read.

The luminance change detection unit 118 includes an image signal reading unit 200 that can read an input image signal from the image buffer unit 116. Further, the image signal reading unit 200 can receive a frame rate converted image signal from the frame rate conversion processing unit 117.

The luminance change detection unit 118 further includes a luminance value calculation unit 201 that can calculate a luminance value of each frame included in the input signal and the frame rate converted image signal read and received by the image signal reading unit 200.

The luminance change detection unit 118 further includes a number-of-frames count unit 202 that can count the number of frames included in the input image signal and the frame rate converted image signal read and received by the image signal reading unit 200. The count processing to be performed by the number-of-frames count unit 202 is described below.

The luminance change detection unit 118 further includes a frame number allocation unit 203 that can allocate a frame number to each frame of the input signal and each frame of the frame rate converted image signal based on a count number obtained by the number-of-frames count unit 202. The frame number allocation processing is described below in more detail.

The luminance change detection unit 118 further includes a temporal luminance change calculation unit 204 that can calculate temporal changes in luminance for respective image signals based on the luminance value of each frame of the input image signal and the frame rate converted image signal calculated by the luminance value calculation unit 201 and the frame number of each frame allocated by the frame number allocation unit 203.

The luminance change detection unit 118 further includes a luminance variation frequency acquisition unit 205 that can calculate and acquire a frequency that represents temporal changes occurring in the luminance of the input image signal based on the temporal changes in luminance of the input image signal calculated by the temporal luminance change calculation unit 204.

The luminance change detection unit 118 further includes a comparison unit 206 that can compare the frequency that represents temporal changes in luminance of the input image signal acquired by the luminance variation frequency acquisition unit 205 with the predetermined frequency that represents temporal changes in luminance.

The luminance change detection unit 118 further includes a target value calculation unit 207 that can determine a luminance target value of each frame of an output image signal to be generated by the frame rate conversion processing apparatus 110 according to a comparison result obtained by the comparison unit 206.

The luminance change detection unit 118 further includes a target value transmission unit 208 that can transmit the target value calculated by the target value calculation unit 207 to the correction unit 119.

In the present exemplary embodiment, the processor and the memory are built in the luminance change detection unit 118 as an example configuration that can execute a computer program to realize each of the above-described functional blocks. However, it is also useful to provide a hardware configuration capable of realizing each functional block.

The correction unit 119 performs correction processing on a frame of the frame rate converted image signal so as to correct unnaturalness in luminance change, if the necessity of the correction processing for the frame is determined by the luminance change detection unit 118.

The frame rate conversion processing apparatus 110 further includes an input frame rate acquisition unit 120 that can acquire a frame rate of the input image signal, as a first frame rate, from the input image signal. The input frame rate acquisition unit 120 can transmit the acquired frame rate of the input image signal to the frame rate conversion processing unit 117 and the luminance change detection unit 118.

The frame rate conversion processing apparatus 110 further includes an output frame rate storage unit 121 that can store an output frame rate value, as a second frame rate, and can transmit the stored value to the frame rate conversion processing unit 117 and the luminance change detection unit 118.

Next, an overall operation that can be performed by the frame rate conversion processing apparatus 110 having the above-described configuration is described below. In the present exemplary embodiment, it is presumed that the frame rate conversion processing apparatus 110 receives an input image signal that can be obtained when a subject whose luminance changes at a pre-known time frequency is captured at an input frame rate of 300 Hz.

Then, the frame rate conversion processing unit 117 performs frame rate conversion processing to generate a converted image signal having an output frame rate of 60 Hz. The correction unit 119 performs correction processing on the frame rate converted image signal to output a corrected output image signal from the frame rate conversion processing apparatus 110. In the present exemplary embodiment, the numerical values representing the input frame rate and the output frame rate are mere numerical examples and any other values can be set appropriately.

First, the image buffer unit 116 receives an input image signal when it is input to the frame rate conversion processing apparatus 110. The image buffer unit 116 temporarily stores the input image signal on frame-by-frame basis. The image buffer unit 116 transmits the temporarily stored input image signal, according to a reading command, to the frame rate conversion processing unit 117 and the luminance change detection unit 118. The image buffer unit 116 has a storage capacity comparable to the image size of several frames or several hundreds of frames.

The input frame rate acquisition unit 120 acquires a frame rate of the input image signal, for example, from Exchangeable image file format (Exif) information or MPEG stream of the input image signal. The input frame rate acquisition unit 120 transmits the acquired input frame rate to the frame rate conversion processing unit 117 and the luminance change detection unit 118 in response to a reading command. In the present exemplary embodiment, the input frame rate is 300 Hz.

Next, the output frame rate storage unit 121 transmits an output frame rate, as the second frame rate, to the frame rate conversion processing unit 117 and the luminance change detection unit 118 in response to a reading command. In the present exemplary embodiment, the output frame rate is 60 Hz.

The output frame rate can be preliminarily set and stored in the output frame rate storage unit 121. Alternatively, an external operation unit can be provided to enable a user to designate a desired value. The operation unit can be configured to transmit a numerical value entered by the user as the output frame rate to the frame rate conversion processing unit 117 and the luminance change detection unit 118.

The frame rate conversion processing unit 117 converts the input image signal received from the image buffer unit 116 to a frame rate comparable to that of the output image signal, and transmits the converted signal to the correction unit 119. More specifically, the frame rate conversion processing unit 117 converts the frame rate in the following manner.

First, the frame rate conversion processing unit 117 counts the number of frames of the image signal input from the image buffer unit 116 and the number of frames of an image signal to be output from the frame rate conversion processing unit 117. The frame rate conversion processing unit 117 performs count processing according to the input frame rate obtained from the input frame rate acquisition unit 120 and the output frame rate obtained by the output frame rate storage unit 121.

In the present exemplary embodiment, the input frame rate is 300 Hz. Therefore, the frame rate conversion processing unit 117 counts 300 frames per second with respect to the input image signal. On the other hand, the output frame rate is 60 Hz. Therefore, the frame rate conversion processing unit 117 counts 60 frames per second with respect to the image signal to be output.

Next, the frame rate conversion processing unit 117 performs frame rate conversion processing based on these count values. In this case, a well-known method can be used to perform the frame rate conversion processing. For example, when the input frame rate is 300 Hz and the output frame rate is 60 Hz, the frame rate conversion processing unit 117 can periodically transmit one frame of five consecutive frames of the input image signal, as a frame that constitutes an output image signal.

For example, the frame transmission period can be obtained by simply dividing the input frame rate by the output frame rate. However, the frame rate conversion method is not limited to the above-described example and an appropriate one of various methods is employable. For example, it is useful to calculate an average luminance value of five frames to obtain a luminance value of a frame to be output.

The above-described numerical values are mere numerical examples and any other values can be appropriately set considering a display panel to be connected to the frame rate conversion processing apparatus or the type of images to be displayed.

FIG. 2 illustrates a correspondence relationship between the input image signal input to the frame rate conversion processing unit 117 and the frame rate converted image signal to be output from the frame rate conversion processing unit 117 in relation to the allocated frame number. In the frame rate conversion processing according to the present exemplary embodiment, a predetermined number of frames are periodically thinned out.

Although the frame rate converted image signal is delayed a predetermined time in output timing relative to the input image signal, these signals are simply illustrated in FIG. 2 so that corresponding frames can be displayed at the same position. The frame numbers, starting with a numerical value "1", are sequentially allocated to the frames of the input image signal.

In the case where the input frame rate is 300 Hz and the output frame rate is 60 Hz, the frame rate conversion processing unit 117 can generate the frame rate converted image signal by selecting one frame every five frames of the input image signal.

More specifically, to generate the frame rate converted image signal, the frame rate conversion processing unit 117 selects the first frame, the sixth frame, the eleventh frame, the sixteenth frame, . . . from the input image signal with reference to the frame numbers allocated thereto. Then, the frame rate conversion processing unit 117 transmits the frame rate converted image signal (i.e., an image signal converted from the input image signal to have the designated output frame rate) to the correction unit 119.

Figure 3:
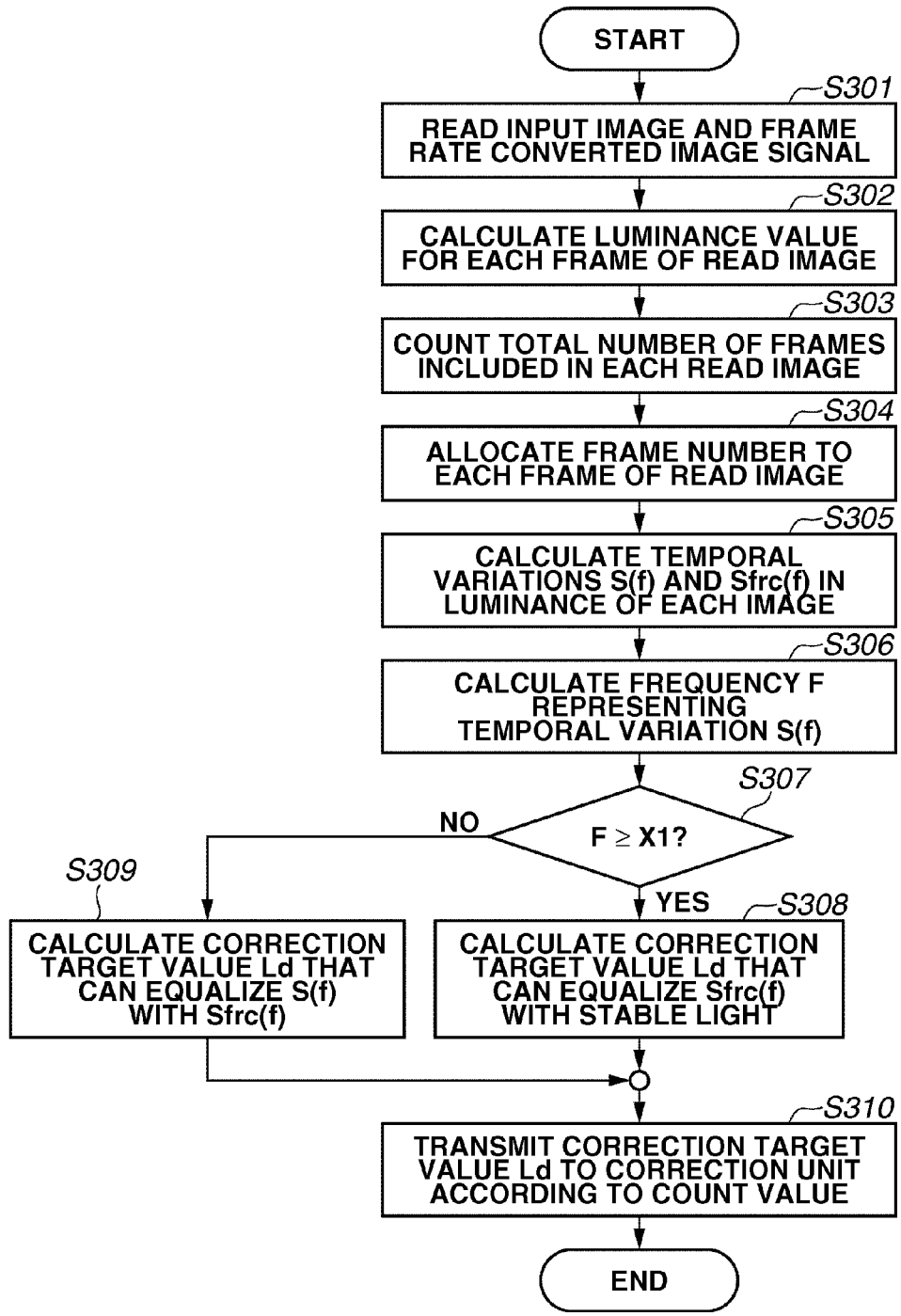
FIG. 3 is a flowchart illustrating luminance change detection processing according to the first exemplary embodiment of the present invention.

The luminance change detection unit 118 calculates and acquires a temporal luminance variation of the input image signal transmitted from the image buffer unit 116. FIG. 3 illustrates example processing contents of a program that can be executed by the processor built in the luminance change detection unit 118. If a hardware configuration is employed to realize each functional block illustrated in FIG. 1B, the contents illustrated in FIG. 3 represent a flow of processing that can be realized by the luminance change detection unit 118.

Hereinafter, the processing to be performed by the luminance change detection unit 118 to calculate and acquire a temporal luminance variation of an input image signal is described below with reference to the flowchart illustrated in FIG. 3. In step S301, the image signal reading unit 200 of the luminance change detection unit 118 transmits a reading command to the image buffer unit 116 and obtains n frames from an input image signal and m frames from a frame rate converted image signal.

In the present exemplary embodiment, n and m are arbitrary values that are equal to or greater than 1. Further, m represents the number of frames that constitute the frame rate converted image signal, which are selected among n frames of the input image signal. In the present exemplary embodiment, for example, if an input image signal includes thirty-one frames (i.e., n=31), sequentially selecting one frame from every five frames included in the input image signal can obtain a frame rate converted image including seven frames (m=7).

In step S302, the luminance value calculation unit 201 of the luminance change detection unit 118 calculates a luminance value of each frame that constitutes the input image signal or the frame rate converted image signal. In the present exemplary embodiment, the luminance value to be obtained in step S302 is an average luminance value of all RGB pixels that constitute the entire screen of one frame. More specifically, the following formula can be used to calculate a luminance value L of an arbitrary frame.

$$L = \frac{1}{xy} \cdot \sum_{i=1, j=1}^{i \to x, j \to y} \frac{R(i, j) + G(i, j) + B(i, j)}{3} \quad (1)$$

I,j: Arbitrary xy-Coordinates

In the formula (1), x and y represent an x-axis length and a y-axis length of the frame, and R(i, j), G(i, j), and B(i, j) represent respective pixel values of the frame.

In step S303, the number-of-frames count unit 202 of the luminance change detection unit 118 counts the number of frames included in the input image signal read from the image buffer unit 116 and the frame rate converted image signal. The count processing to be performed by the number-of-frames count unit 202 is similar to that performed by the frame rate conversion processing unit 117, and therefore the description thereof is not repeated.

In step S304, the frame number allocation unit 203 of the luminance change detection unit 118 calculates a frame number f with reference to the input frame rate and the output frame rate. Then, the frame number allocation unit 203 allocates the frame number f to each frame of the input image signal and the frame rate converted image signal as described above with reference to FIG. 2. In this case, the input frame rate and the output frame rate are values acquired from the input frame rate acquisition unit 120 and the output frame rate storage unit 121.

First, when the number-of-frames count unit 202 counts the number of the frames included in the input image signal in step S303, the frame number allocation unit 203 successively allocates each count number as the frame number f to a corresponding frame of the input image signal. Then, the frame number allocation unit 203 calculates a frame number f that corresponds to the count number of the frame rate converted image signal using the following formula.

$$f \cong \frac{\text{input frame rate}}{\text{output frame rate}} - (a - 1) + k \quad (2)$$

a: count number of frame rate converted images
k: arbitrary value

In the above-described formula (2), k represents an initial frame number of the frame rate converted image signal. In the present exemplary embodiment, the initial frame number is 1 (i.e., k=1) because the initially selected frame is the first frame. Accordingly, the frame to be output first is a frame having a frame number 1 and the frame to be output second is a frame having a frame number 6. The frame number allocation unit 203 allocates the frame number obtained from the formula (2) to each frame of the frame rate converted image signal.

In step S305, the temporal luminance change calculation unit 204 of the luminance change detection unit 118 calculates temporal changes in luminance of the input image signal and the frame rate converted image signal based on the frame number f and the luminance value of each frame.

The temporal luminance change calculation unit 204 obtains a temporal variation S(f) in the luminance value L of the input image signal as a row of luminance values L of respective frames that constitute the input image signal calculated in step S302, which are arrayed according to the frame number acquired in step S304.

Further, the temporal luminance change calculation unit 204 performs similar processing on the frame rate converted image signal to obtain a temporal variation Sfrc(f) in the luminance value L of the frame rate converted image signal. It may be useful to calculate the temporal variation Sfrc(f) in step S309.

Figure 4:
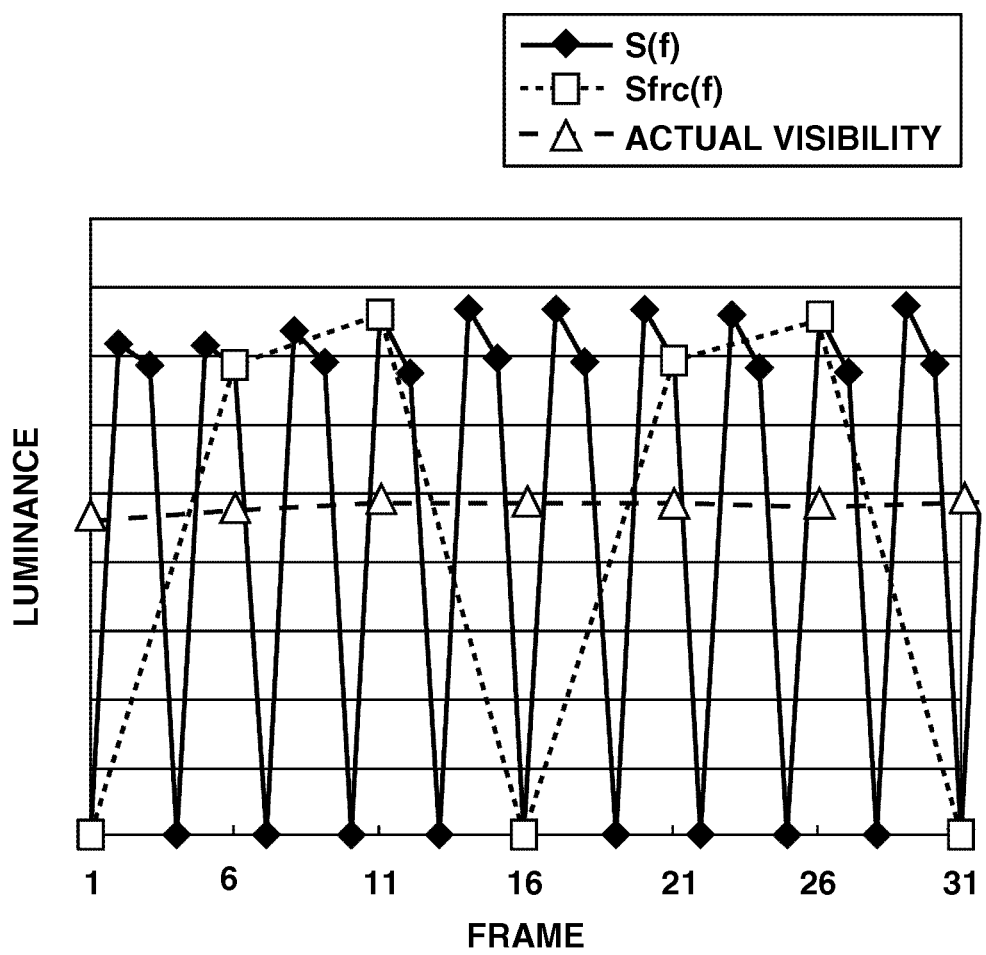
FIG. 4 is a graph illustrating temporal changes in luminance of an input image signal and a frame rate converted image signal, in relation to actual visibility, according to the first exemplary embodiment of the present invention.

FIG. 4 illustrates the temporal luminance variation S(f) of the input image signal and the temporal luminance variation Sfrc(f) of the frame rate converted image signal. In this case, if the frequency that represents temporal changes in luminance of the captured subject is sufficiently high (e.g., 100 Hz), the captured subject can be visually recognized as stable light.

In the present exemplary embodiment, the light that can be visually recognized as constantly maintaining predetermined brightness is referred to as stable light. Natural light represented by solar light and light generated by artificial lighting (e.g., fluorescent lighting and incandescent lighting) are examples of the stable light.

FIG. 4 further illustrates actual visibility of the temporal luminance variation S(f) occurring in the input image signal. It is understood that the temporal luminance variation Sfrc(f) of the frame rate converted image signal cannot reproduce the actual visibility. In this case, the actual visibility is presumed as an average value of the temporal variation S(f) in the luminance value L of the input image signal according to the Talbot's law. The following formula can be used to calculate the actual visibility.

$$\text{Actual visibility} = \frac{\sum_{k=1}^{k \to Fin/F} S(k)}{n} \quad (3)$$

Fin: input frame rate
F: temporal luminance variation frequency of subject

However, an example method for calculating the frequency F representing temporal changes in the luminance of the captured subject is described below in step S306. The above-described formula (3) obtains an average luminance change value of the captured subject during one period by obtaining an average value of Fin/F frames. The actual visibility may be an average S(f) value of all frames having been input in the luminance change detection unit 118, not the average value during one period.

In step S306, the luminance variation frequency acquisition unit 205 of the luminance change detection unit 118 calculates and acquires the frequency F representing temporal changes in luminance of the input image signal based on the temporal luminance variation S(f) of the captured subject that has been obtained in step S305.

The frequency F representing temporal changes in the luminance of the captured subject can be obtained by calculating an average luminance value Lth with reference to a maximum luminance value Lmax and a minimum luminance value Lmin of the input image signal, of n frames having been input, and counting the number of times that the luminance of the input image signal has passed across the average luminance value Lth among the first to the n-th frames. An example calculation of the average luminance value Lth is described below.

$$Lth = \frac{(L_{max} + L_{min})}{2} \quad (4)$$

In the example illustrated in FIG. 4, it is presumed that the number of times that the temporal luminance variation S(f) passes across the average luminance value Lth among the first to the n-th frames is p times. Therefore, if the temporal luminance variation can be regarded as a sine wave, the frequency F representing temporal changes occurring in the luminance of the input image signal can be calculated using the following formula (5).

$$F \cong \frac{\left(\frac{p}{2}\right)}{\left(\frac{n}{\text{input frame rate}}\right)} \quad (5)$$

According to the example illustrated in FIG. 4, the frequency F representing temporal changes in the luminance of the captured subject can be calculated as being approximately 100 Hz by entering values n=31 and p=20 into the formula (5). As described above, the luminance variation frequency acquisition unit 205 can acquire a frequency that represents temporal changes in luminance of each input image signal.

In the present exemplary embodiment, the frame rate conversion processing apparatus 110 internally processes calculations for the frequency that represents temporal changes in luminance of the input image signal. However, it is also useful if an external calculation unit configured to perform the above-described calculation processing is provided outside the frame rate conversion processing apparatus 110. In this case, the luminance variation frequency acquisition unit 205 acquires a temporal variation frequency from the calculation unit that has performed the calculation processing.

In step S307, the comparison unit 206 of the luminance change detection unit 118 determines a method for correcting the frame rate converted image signal, referring to the magnitude of the temporal variation frequency F as a luminance change value. More specifically, the comparison unit 206 classifies the luminance variation of a captured subject into a state (I) where the subject can be recognized as stable light or a state (II) where changes in luminance of the subject can be recognized, with reference to the magnitude of the temporal variation frequency F. If it is determined that the luminance variation of the captured subject is classified into the state I (YES in step S307), the processing proceeds to step S308. If it is determined that the luminance variation of the captured subject is classified into the state II (NO in step S307), the processing proceeds to step S309.

The determination method in step S307 is described below in more detail. The above-described state (I) (i.e., the state where a captured subject is recognized as stable light) is a state where temporal changes in luminance occur at a very high frequency and human eyes cannot recognize the temporal changes in luminance because of the fact that sensible light on human retina is an amount of summed-up light emission in respective frames. It is generally known that temporal changes in luminance, if occur at 60 Hz or at a higher frequency, cannot be visually recognized by human eyes. In the present exemplary embodiment, the above-described critical frequency is referred to as a threshold X1.

For example, when an image is illuminated with fluorescent lighting, the image can be recognized as having temporal changes in luminance occurring at 60 Hz or at a higher frequency. If it is determined that the frequency F representing temporal changes in luminance of a captured subject exceeds the threshold X1 (=60 Hz), the comparison unit 206 classifies the luminance variation of the captured subject into the state I. As the frequency F is approximately 100 Hz, the temporal changes in luminance cannot be perceived. Therefore, the comparison unit 206 classifies the above-described n frames of the input image signal into the state I.

The state (II) (i.e., the state where luminance changes are detectable) is a state where the frequency representing temporal luminance changes is less than the threshold X1, in which temporal changes in luminance are visually recognizable and a displayed screen may flicker. If it is determined that the frequency F representing temporal changes in luminance of the captured subject is less than the comparison unit 206 classifies the luminance variation of the captured subject into the state II.

The above-described numerical values are mere numerical examples and any other values can be appropriately set considering a display panel to be connected to the frame rate conversion processing apparatus or the type of images to be displayed. For example, if a display panel to be connected to the frame rate conversion processing apparatus is an impulse type in light emission, temporal changes in luminance may be visually recognizable even when the frequency is greater than 60 Hz. In this case, it may be desired to set a higher threshold (e.g., 70 Hz).

Further, even when the frequency that represents temporal changes in luminance of an input image signal is greater than the threshold X1, flickers may be visually recognized if the amplitude of the luminance is large. Hence, when the amplitude of the luminance of the input image signal is equal to or greater than q % of the average luminance value Lth, it may be useful to select the state (II) (i.e., the state where temporal changes in luminance can be visually recognized by human eyes) even when the frequency representing temporal changes in luminance is equal to or greater than X1.

However, the above-described value q is an arbitrary value. As described above, the comparison unit 206 determines an adequate correction method based on a comparison between the variation frequency representing the luminance of the input image signal and the predetermined frequency that represents temporal luminance changes.

In step S308, the target value calculation unit 207 of the luminance change detection unit 118 calculates a correction target value Ld(f) of the frame rate converted image signal so that the temporal luminance variation Sfrc(f) of the frame rate converted image signal becomes similar to the stable light.

First, the target value calculation unit 207 acquires the input frame rate and the output frame rate from the input frame rate acquisition unit 120 and the output frame rate storage unit 121. In the present exemplary embodiment, as described above, the input frame rate is 300 Hz and the output frame rate is 60 Hz. Therefore, the time period during which one frame of the frame rate converted image signal is displayed is equivalent to the time period during which five frames of the input image signal are displayed.

Hence, the target value calculation unit 207 obtains an average luminance of every five frames that constitute the input image signal as a value to be equalized with the stable light. To this end, the target value calculation unit 207 calculates average RGB pixel values for every five frames (i.e., first to fifth frames, sixth to tenth frames, eleventh to fifteenth frames, of the input image signal to obtain a pixel value of each frame of the frame rate converted image signal.

Figure 5:
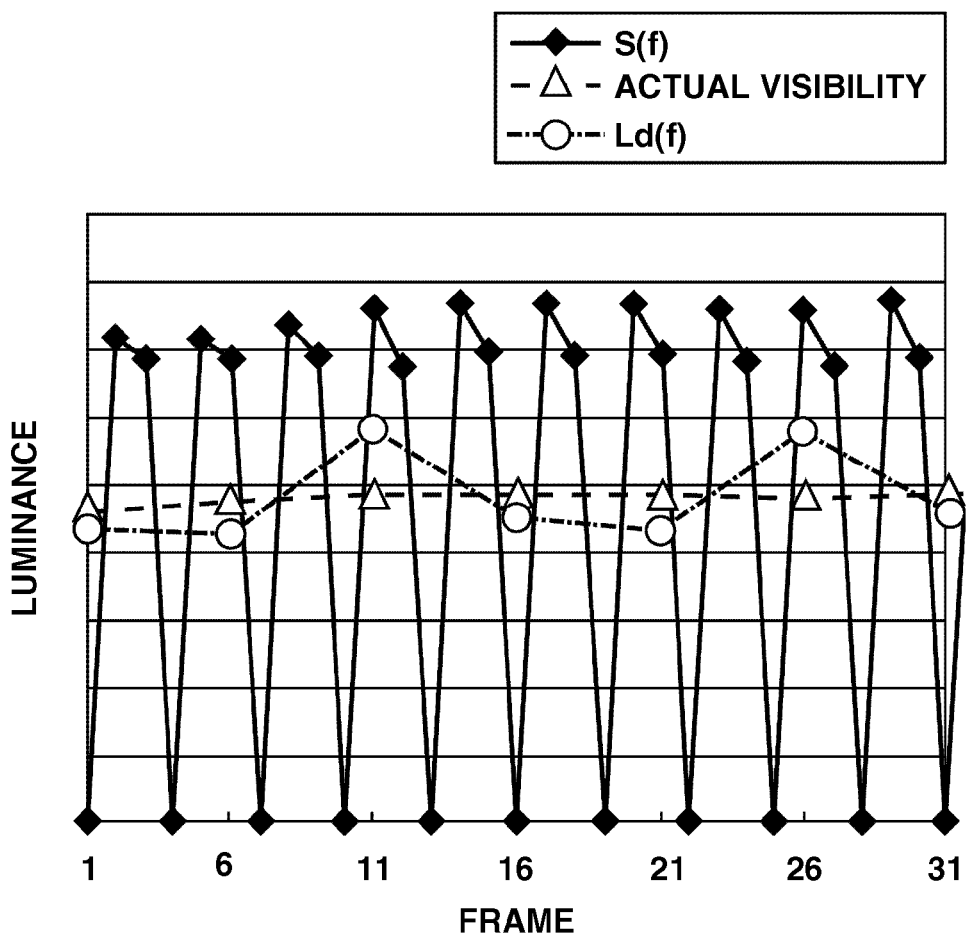
FIG. 5 is a graph illustrating temporal changes in luminance of an input image signal and a correction target value, in relation to actual visibility, according to the first exemplary embodiment of the present invention.

Then, as understood from the graph illustrated in FIG. 5 (see Ld(f)), the luminance variation is similar to the actual visibility of the captured subject. FIG. 5 illustrates a relationship between the luminance variation S(f) and the correction target value Ld(f) of the input image signal in relation to actual visibility of the captured subject, in which an average pixel value of the entire frame screen is regarded as luminance value.

If Ld(f) represents a pixel value corresponding to the frame number f, the following formula can be used to calculate the pixel value Ld(f). In this case, the frame number f is a number that can be calculated based on the output frame rate and allocated to a frame of the frame rate converted image signal.

$$Ld(f) = \frac{\sum_{f-k}^{f \to k \to 4} Lin(f)}{5} \quad (6)$$

The obtained pixel value Ld(f) is the correction target value that can be applied to the frame rate converted image signal. In the above-described formula (6), Lin(f) represents an RGB pixel value of the input image signal at an arbitrary coordinate position and k represents an arbitrary frame number.

Further, the target value calculation unit 207 calculates Ld(f) for each of RGB pixels. In the present exemplary embodiment, as the value Lin(f) represents each pixel of one frame, the average pixel value of five frames is a value that can be obtained by calculating an average pixel value of five frames that correspond to each pixel position. Thus, it becomes feasible to realize frame rate conversion processing capable of converting an input image signal into a signal having luminance variation resembling actual visibility.

Further, in the above-described exemplary embodiment, the target value calculation unit 207 uses the average of RGB pixel values obtained from every five frames to calculate the luminance value of the frame rate converted image signal so as to have luminance variation resembling stable light. However, the correction method is not limited to the above-described method. Any other method is selectable among various types of methods if usage of the selected method is appropriate.

As described above, the frequency that represents temporal changes in luminance of the input image signal is approximately 100 Hz and the frame rate of the input image signal is 300 Hz. Therefore, one period of the temporal luminance variation of the captured subject is equivalent to three frames. Thus, the target value calculation unit 207 can calculate an average pixel value at predetermined intervals corresponding to a multiple of three frames, to obtain the target pixel value Ld that is small in luminance variation and resembles stable light.

For example, if an average value is obtained for every six frames, the target value calculation unit 207 can obtain the correction target value Ld that has the luminance value resembling the visibility of every five frames and small in luminance variation compared to the average value of every five frames.

In step S309, the target value calculation unit 207 of the luminance change detection unit 118 calculates a correction target value Ld(f) that can equalize the luminance variation Sfrc(f) of the frame rate converted image signal with the luminance variation S(f) of the input image signal.

Figure 6:
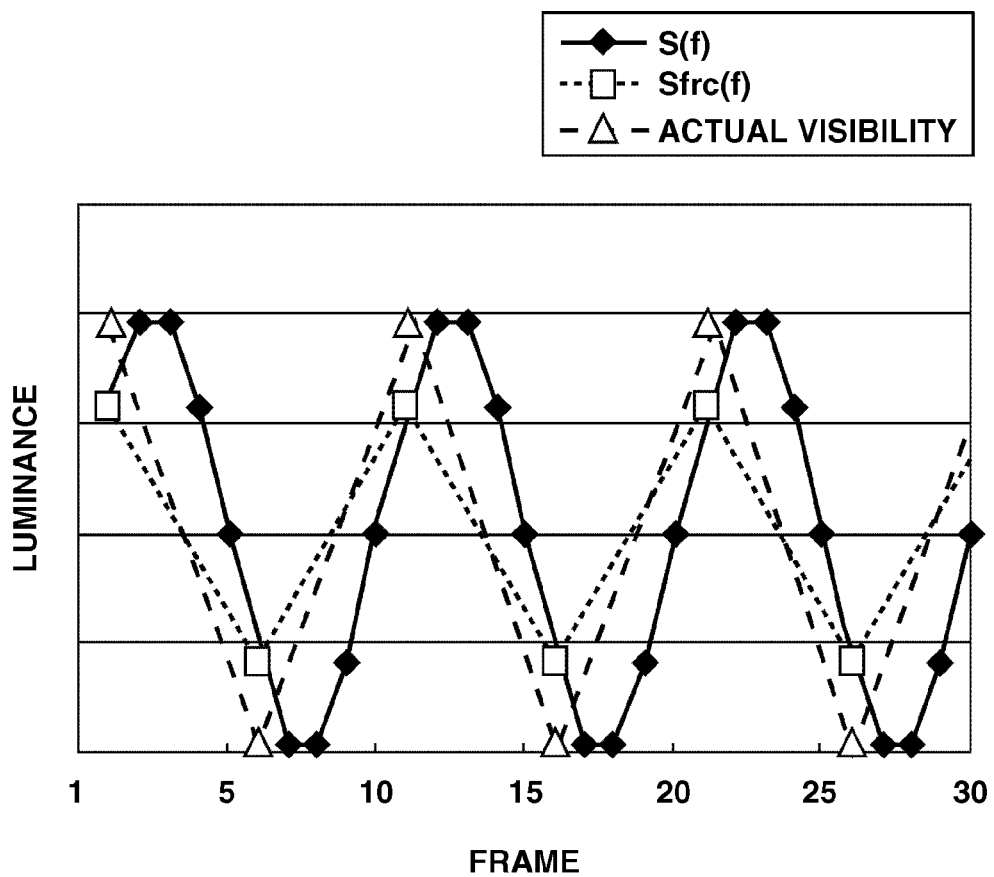
FIG. 6 is a graph illustrating temporal changes in luminance of an input image signal, a frame rate converted image signal, and a correction target value according to the first exemplary embodiment of the present invention.

FIG. 6 illustrates the temporal luminance variation S(f) of the input image signal and the temporal luminance variation Sfrc(f) of the frame rate converted image signal when the frequency F representing temporal changes in luminance of the subject captured in the input image signal is 30 Hz. As understood from FIG. 6, the temporal luminance variation Sfrc(f) cannot reproduce the luminance amplitude of S(f).

Hence, the target value calculation unit 207 corrects the frame rate converted image signal in such a way as to equalize the luminance amplitude of the frame rate converted image signal with the luminance amplitude of the input image signal.

More specifically, the correction target value Ld(f) of each RGB pixel at the frame number f can be obtained using the following formula.

$$Ld(f) = Lfrc(f) \cdot \frac{L_{max} - L_{min}}{L'_{max} - L'_{min}} \quad (7)$$

In the above-described formula (7), Lfrc(f) represents the temporal luminance variation of the frame rate converted image signal that can be calculated using the formula (1). Lmax and Lmin represent a maximum pixel value and a minimum pixel value among n frames of the input image signal. Further, L'max and L'min represent a maximum pixel value and a minimum pixel value among m frames of the frame rate converted image signal. FIG. 6 illustrates the temporal luminance variation of the correction target value L(d), according to which the luminance amplitude of L(d) resembles the luminance variation of the input image signal, compared to that of Sfrc(f).

The above-described method is a mere example method. The method for calculating the correction target value L(d) is not limited to the above-described method. For example, an average pixel value of the (f−1)th frame and the (f+1)th frame of the input image signal may be used.

In step S310, the target value transmission unit 208 of the luminance change detection unit 118 transmits the correction target value Ld(f) obtained in step S308 or step S309 to the correction unit 119 according to the count value obtained in step S303.

The correction unit 119 generates a frame of the frame rate converted image signal so as to correspond to the frame number f in the output order, using the correction target value Ld(f) obtained by the luminance change detection unit 118. The correction unit 119 outputs the generated frames as an output image of the frame rate conversion processing apparatus 110. As described above, the frame rate conversion processing apparatus 110 can generate an output image having luminance variation resembling actual visibility.

More specifically, the correction processing includes transmitting the correction target value Ld(f) for each RGB pixel value, instead of the frame. Further, the correction method is not limited to the above-described method. For example, it is useful to search a frame whose luminance value L is similar to the correction target value Ld(f) among a frame identified by the frame number f and some of preceding and following frames included in the input image signal and transmit the obtained frame instead of the corresponding frame of the frame rate converted image signal.

Performing the above-described processing and control is useful to equalize the luminance variation of a frame rate converted image with actual visibility. Further, it may be useful to perform the above-described processing and control only when a user operates an operation unit to instruct the frame rate conversion correction processing.

In the present exemplary embodiment, the above-described correction processing is performed when the input frame rate of 300 Hz is converted into the output frame rate of 60 Hz. However, the above-described correction processing can be applied to another conversion.

As already described, the temporal variation frequency at which temporal luminance changes cannot be visually recognized by human eyes is approximately equal to or greater than 60 Hz. Accordingly, the above-described correction processing is employable when an image signal having a frame rate that can record temporal luminance changes and is equal to or greater than 60 Hz (e.g., approximately equal to greater than 120 Hz) is converted into an image signal having a lower frame rate. For example, the above-described correction processing is effective when the frame rate is converted from 240 Hz to 48 Hz or from 300 Hz to 24 Hz.

The frame rate conversion processing apparatus according to the present exemplary embodiment, if the frequency that represents temporal changes in luminance of the input image signal exceeds a predetermined frequency that represents temporal luminance changes, generates an output image signal based on the input image signal in such a way as to prevent the output image from including temporal luminance changes that can be perceived by human eyes.

More specifically, if it is determined that a captured subject in an input image signal is emitting stable light, the frame rate conversion processing apparatus according to the present exemplary embodiment generates an output image that is corrected in such a manner that the frame rate converted subject has luminance variation similar to the stable light. Accordingly, the frame rate conversion processing apparatus according to the present exemplary embodiment can prevent any object that can be recognized as emitting stable light from being observed as if its luminance is changing in a video obtained through the frame conversion processing.

Further, if it is determined that the luminance of a subject captured in the input image signal is changing, the frame rate conversion processing apparatus according to the present exemplary embodiment can perform correction processing so as to equalize changes in luminance of a frame rate converted captured subject with the changes in luminance of the subject captured in the input image signal. As described above, the frame rate conversion processing apparatus according to the present exemplary embodiment can prevent a video obtained through the frame conversion processing from becoming visually unnatural.

Processing according to a second exemplary embodiment includes correction using visual perceptual response characteristics (i.e., time-frequency response characteristics representing visually recognizable luminance) in the luminance change detection, as described below. First, an example configuration of the apparatus is described below.

FIG. 7A is block diagram illustrating an example configuration of a frame rate conversion processing apparatus that can perform frame rate conversion processing according to the second exemplary embodiment. The frame rate conversion processing apparatus illustrated in FIG. 7A includes an image buffer unit 116, a frame rate conversion processing unit 117, a correction unit 119, an input frame rate acquisition unit 120, and an output frame rate storage unit 121, which are similar to those described in the first exemplary embodiment and therefore the descriptions thereof are not repeated.

The frame rate conversion processing apparatus further includes a visual perceptual response characteristics storage unit 701 that stores visual perceptual response characteristics and can transmit the stored information to a luminance change detection unit 300.

The luminance change detection unit 300 calculates and acquires a frequency that represents temporal changes in luminance of the input image signal readout of the image buffer unit 116. Further, the luminance change detection unit 300 calculates and acquires a frequency that represents temporal changes in luminance of the frame rate converted image signal received from the frame rate conversion processing unit 117.

Then, the luminance change detection unit 300 acquires an evaluation value of the input image signal and an evaluation value of the frame rate converted image signal using the visual perceptual response characteristics received from the visual perceptual response characteristics storage unit 701. Then, the luminance change detection unit 300 compares a difference between the evaluation value of the input image signal and the evaluation value of the output image signal with a predetermined value, and determines a correction target value of the frame rate converted image signal according to a result of the comparison. Then, the luminance change detection unit 300 causes the correction unit 119 to perform correction processing based on the determined correction target value.

Figure 7B:
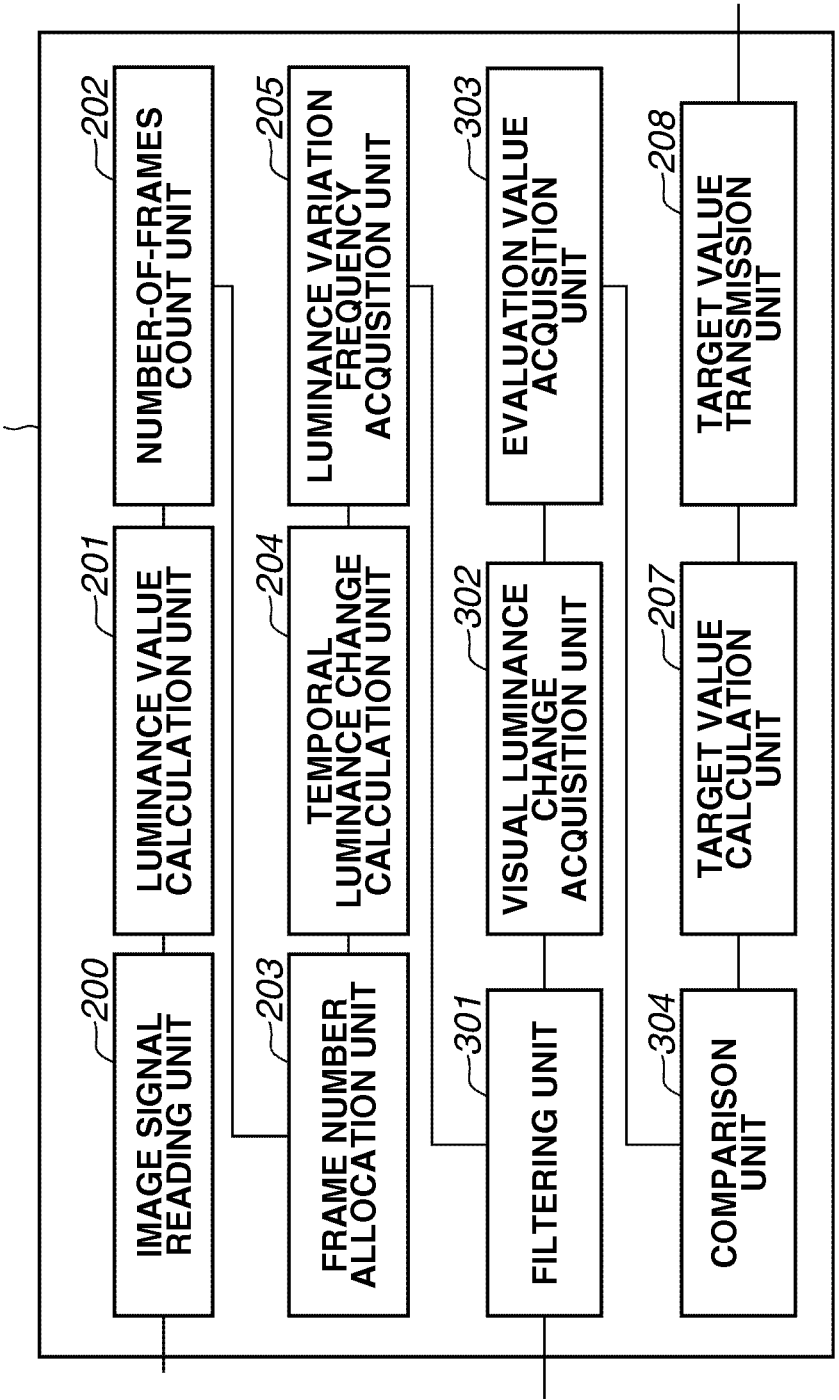
FIG. 7B is a functional block diagram illustrating a luminance change detection unit according to the second exemplary embodiment of the present invention.

FIG. 7B illustrates a functional block diagram of the luminance change detection unit 300. A processor and a memory, which are built in the luminance change detection unit 300, can cooperatively realize each functional block illustrated in FIG. 7B.

The processor built in the luminance change detection unit 300 is a computer that can execute a program loaded from the memory built in the luminance change detection unit 300. The memory built in the luminance change detection unit 300 is a storage medium capable of storing the program that the processor can read.

The luminance change detection unit 300 includes an image signal reading unit 200, a luminance value calculation unit 201, a number-of-frames count unit 202, a frame number allocation unit 203, a temporal luminance change calculation unit 204, and a luminance variation frequency acquisition unit 205, which are functionally similar to those described in the first exemplary embodiment and therefore the descriptions thereof are not repeated.

The luminance change detection unit 300 further includes a filtering unit 301 that can read the visual perceptual response characteristics from the visual perceptual response characteristics storage unit 701. Then, the filtering unit 301 filters the frequency that represents temporal changes in luminance of the input image signal, which has been calculated by the temporal luminance change calculation unit 204, using the visual perceptual response characteristics. The luminance change detection unit 300 further includes a visual luminance change acquisition unit 302 that can acquire filtered frequency that represents temporal changes in luminance.

Further, the luminance change detection unit 300 includes an evaluation value acquisition unit 303 that can calculate and acquire an evaluation value for the input image based on the filtered frequency that represents temporal luminance changes, which has been acquired by the visual luminance change acquisition unit 302. In addition, the evaluation value acquisition unit 303 can calculate and acquire an evaluation value for the frame rate converted image signal based on the frequency that represents temporal changes in luminance of the frame rate converted image signal and the visual perceptual response characteristics.

Further, the luminance change detection unit 300 includes a comparison unit 304 that can compare a difference between the acquired evaluation value of the input image signal and the evaluation value of the frame rate converted image signal with a predetermined value. Additionally, the luminance change detection unit 300 includes a target value calculation unit 207 that can calculate a correction target value to correct the frame rate converted image signal based on a result of the comparison obtained by the comparison unit 304. Moreover, the luminance change detection unit 300 includes a target value transmission unit 208 that can transmit the correction target value to the correction unit 119.

In the present exemplary embodiment, the processor and the memory are built in the luminance change detection unit 300 as an example configuration that can execute a computer program to realize each of the above-described functional blocks. However, it is also useful to provide a hardware configuration capable of realizing each functional block.

The correction unit 119 corrects the frame rate converted image signal using the correction target value transmitted from the luminance change detection unit 300 and generates an output signal.

Next, an overall operation that can be performed by the frame rate conversion processing apparatus 110 is described below. In the present exemplary embodiment, it is presumed that the frame rate conversion processing apparatus 110 receives, as an input image signal, an image signal that can be obtained when a subject whose luminance changes at a preknown time frequency is captured at the input frame rate of 300 Hz. Then, the frame rate conversion processing unit 117 performs frame rate conversion processing to generate a frame rate converted image signal having an output frame rate of 60 Hz.

Subsequently, the correction unit 119 performs correction processing on the frame rate converted image signal and outputs the corrected image signal as an output image signal of the frame rate conversion processing apparatus 110.

Figure 8:
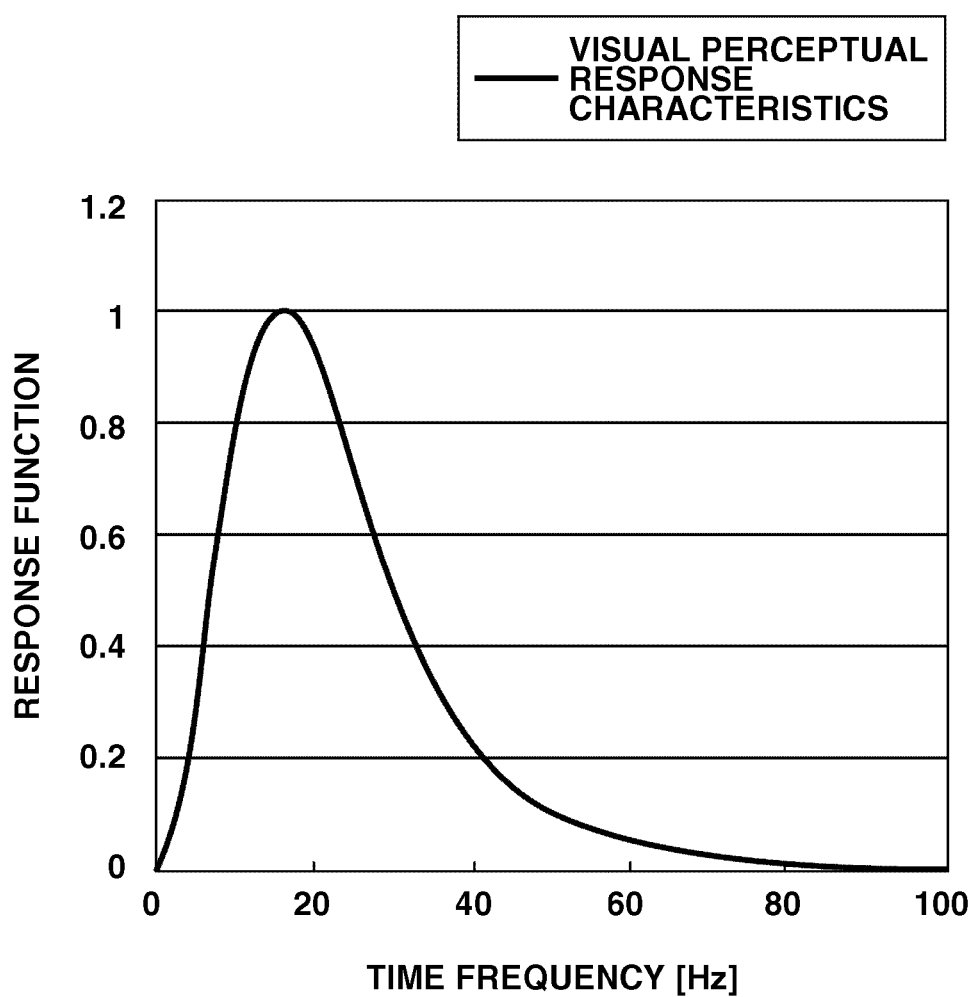
FIG. 8 is a graph illustrating visual perceptual response characteristics according to the second exemplary embodiment of the present invention.

The visual perceptual response characteristics storage unit 701 outputs the stored visual perceptual response characteristics and a threshold Cth according to a reading command received from the luminance change detection unit 300. FIG. 8 illustrates visual perceptual response characteristics VTF as a response function that is variable depending on time frequency when the luminance changes temporally. The visual perceptual response characteristics VTF can be obtained using the following formula and can be used as a band-pass filter.

$$VTF(ft) = ft^{0.4}[1 + \{0.7 \cdot ft/(2\pi \cdot k1)\}^2]^{-2} \quad (8)$$

ft: frequency [cycle/sec]
k1: coefficient

The above-described formula (8) is an example model that represents visual perceptual response characteristics (as discussed in Toshikazu Matsui, "A Spatio-Temporal Human Vision Modeling with a multiple-channel Structure and Quantitative Reproduction of Visual Responses to Flickering Images", Transactions on the institute of Electronics, Information and Communication Engineers, Vol. J77-D-II No. 10, pp 2106, Japan, the Institute of Electronics, Information and Communication Engineers, October 1994).

The visual perceptual response characteristics storage unit 701 may store a plurality of kinds of visual perceptual response characteristics, which are variable depending on the magnitude of luminance, chromaticity, and spatial frequency of the screen. In this case, the visual perceptual response characteristics storage unit 701 selectively outputs optimum visual perceptual response characteristics so as to correspond to a reading command.

Figure 9:
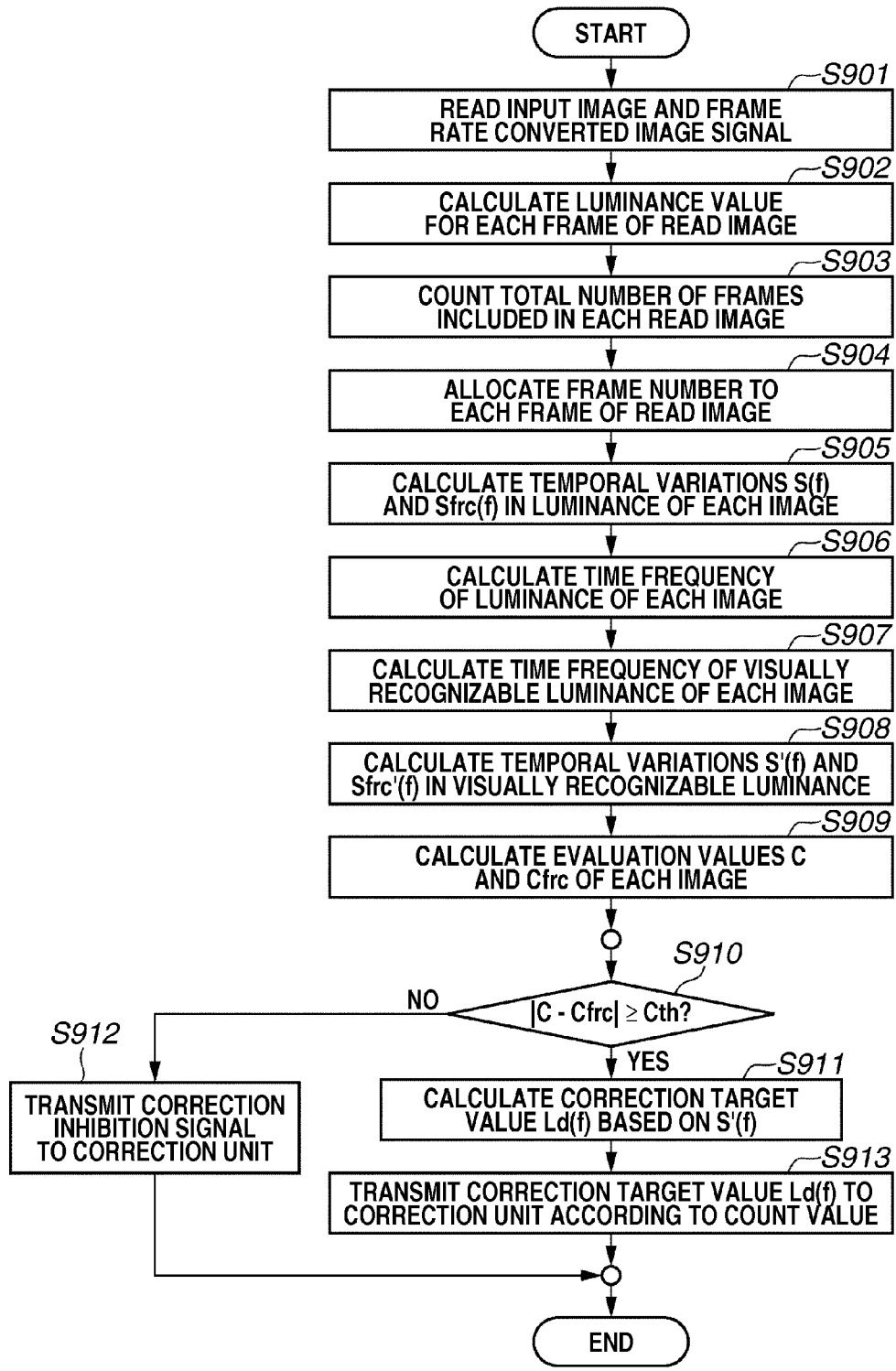
FIG. 9 is a flowchart illustrating luminance change detection processing according to the second exemplary embodiment of the present invention.

The luminance change detection unit 300 calculates a visually recognizable luminance change evaluation value, and calculates a correction amount so as to equalize changes in luminance of the frame rate converted image signal with actual visibility. FIG. 9 illustrates example processing contents of a program that can be executed by the processor built in the luminance change detection unit 300. If a hardware configuration is employed to realize each functional block illustrated in FIG. 7B, the contents illustrated in FIG. 9 represent a flow of processing that can be realized by the luminance change detection unit 300.

Hereinafter, the example processing is described below with reference to the flowchart illustrated in FIG. 9. Processing to be performed in step S901 to step S905 is similar to the processing performed in step S301 to step S305 illustrated in FIG. 3 and therefore the descriptions thereof are not repeated.

In step S906, the luminance variation frequency acquisition unit 205 of the luminance change detection unit 300 applies Fourier transformation to the temporal luminance variation S(f) of the input image signal and the temporal luminance variation Sfrc(f) of the frame rate converted image signal. As a result, the luminance variation frequency acquisition unit 205 acquires a frequency that represents temporal changes in luminance of the input image signal and a frequency that represents temporal changes in luminance of the frame rate converted image signal.

It is now presumed that FIG. 4 illustrates the temporal luminance variations S(f) and Sfrc(f) calculated in step S905 and a condition S(f)=S(f+N) is satisfied when N represents the period of S(f). The luminance variation frequency acquisition unit 205 performs Fourier transformation using the following formula to calculate a frequency S_FT(ft) that represents temporal changes in luminance.

$$S\_FT(ft) = \sum_{ft=0}^{N-1} S(f) \exp\left(-i \frac{2\pi \cdot ft \cdot f}{N}\right) \quad (9)$$

ft: frequency [cycle/sec]

In this case, the luminance change detection unit 300 calculates the period N satisfying the condition S(f)=S(f+n) while defining that the period N is an integer multiple of the frame n in which the luminance value L(f) of the input image signal has passed across the average luminance value Lth two times or more among the f-th to n-th frames. Similarly, the luminance change detection unit 300 calculates a frequency Sfrc_FT(ft) that represents temporal changes in luminance of the frame rate converted image signal.

Figure 10:
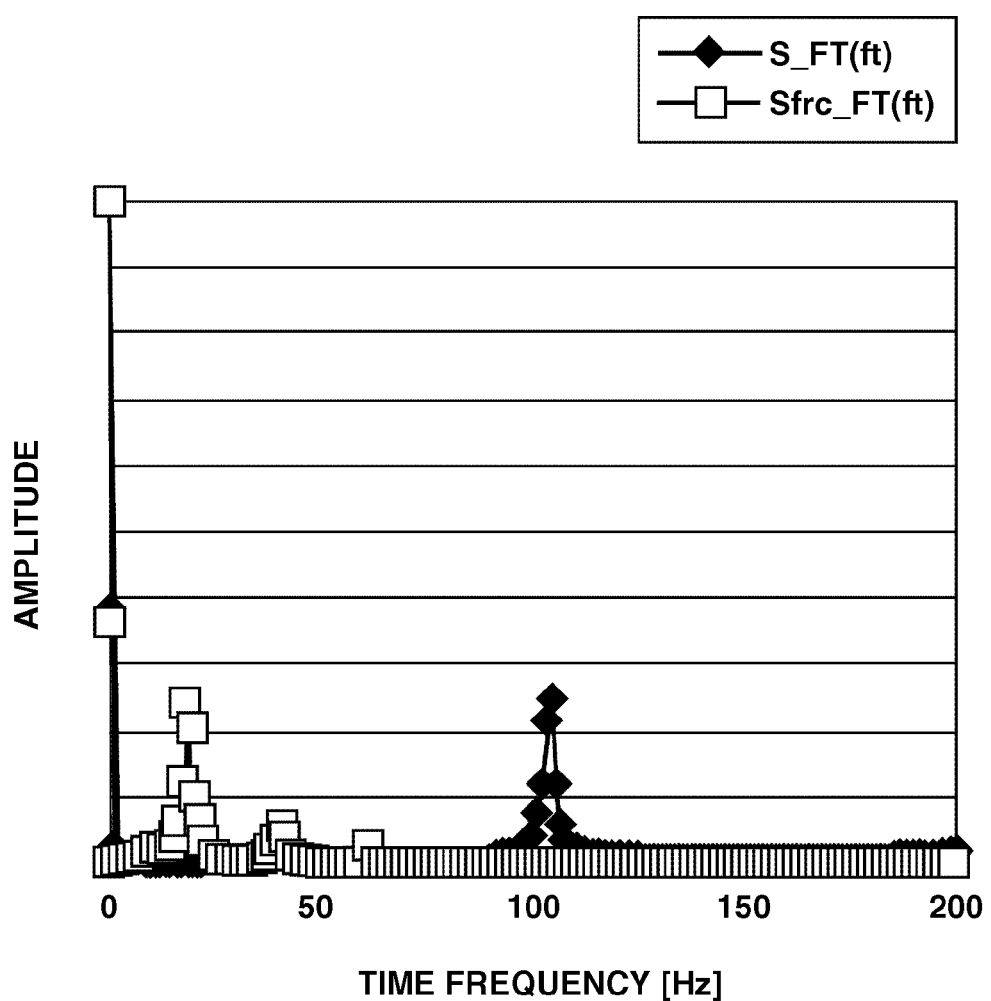
FIG. 10 is a graph illustrating time-frequency spectra in luminance of an input image signal and a frame rate converted image signal according to the second exemplary embodiment of the present invention.

FIG. 10 illustrates normalized power components of each frequency spectrum. In FIG. 10, the abscissa axis represents time frequency and the ordinate axis represents amplitude of the spectrum. It is understood that the frequency spectrum representing the temporal luminance variation S_FT(ft) of the input image signal has a peak at or in the vicinity of 100 Hz. The frequency spectrum representing the temporal luminance variation Sfrc_FT(ft) of the frame rate converted image signal has a peak at or in the vicinity of 20 Hz.

In step S907, the filtering unit 301 of the luminance change detection unit 300 calculates a frequency that represents temporal changes in visually recognizable luminance, which can be obtained by multiplying the frequency that represents temporal changes in luminance of each of the input image signal and the frame rate converted image signal by visual timefrequency characteristics. More specifically, the filtering unit 301 uses the following formula in calculation to filter S_FT (ft) and Sfrc_FT(ft) obtained in step S906 with VTF(ft) defined by the formula (8).

$$S\_VTF(ft) = S\_FT(ft) \cdot VTF(ft)$$

$$Sfrc\_VTF(ft) = Sfrc\_FT(ft) \cdot VTF(ft) \quad (10)$$

Figure 11:
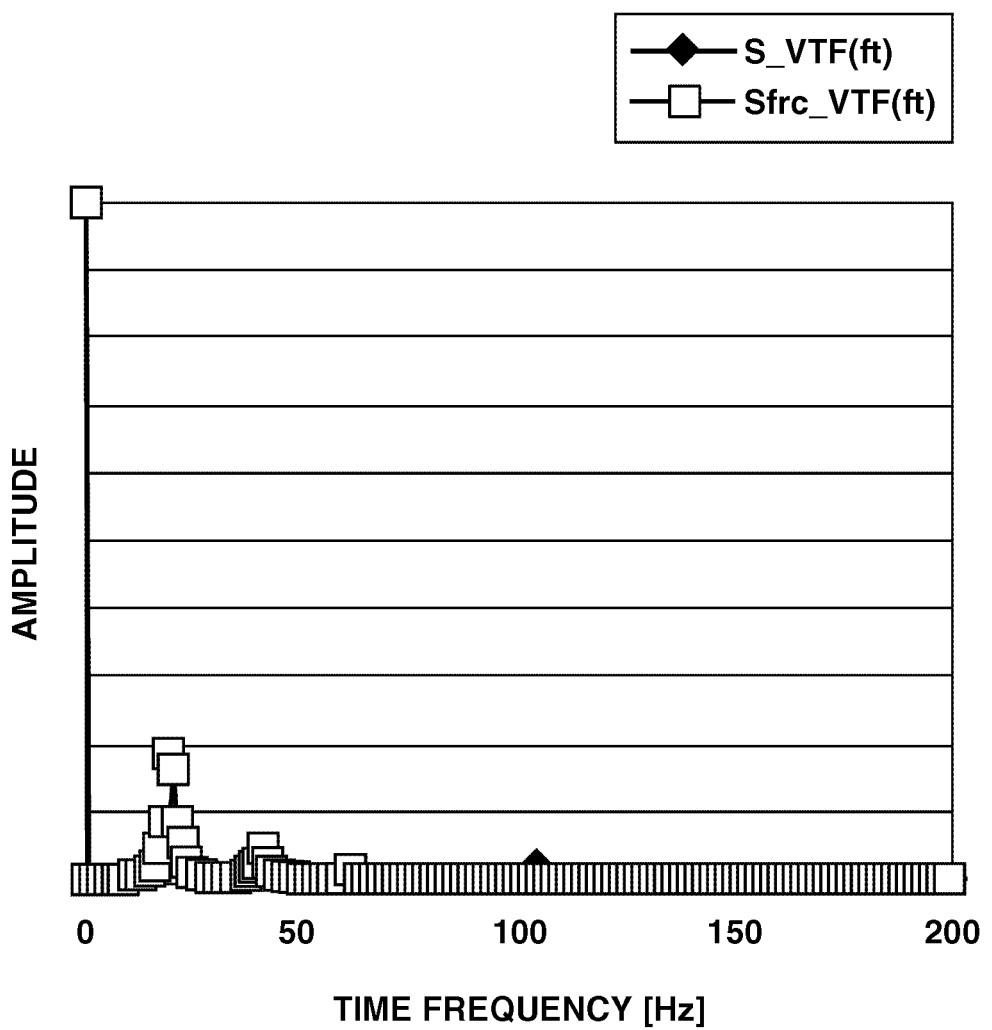
FIG. 11 illustrates normalized time-frequency spectra in visually recognizable luminance of an input image signal and a frame rate converted image signal according to the second exemplary embodiment of the present invention.

However, a direct-current component that represents the average luminance remains unchanged because no filtering is applied to it. FIG. 11 illustrates normalized power components of frequency characteristics S_VTF(ft) and Sfrc_VTF(ft) that represent visually recognizable changes in luminance. As illustrated in FIG. 8, VTF(ft) has a lower sensitivity in the high-frequency region. It is therefore apparent that the spectrum illustrated in FIG. 11 attenuates at the high-frequency region compared to a previous state where the filtering by VTF(ft) is not applied.

In step S908, the visual luminance change acquisition unit 302 of the luminance change detection unit 300 calculates temporal changes in visually recognizable luminance of each of the input image signal and the frame rate converted image signal by applying inverse Fourier transformation to the frequency that represents temporal changes in visually recognizable luminance. The visual luminance change acquisition unit 302 can use the following formula to obtain a temporal variation S'(f) in visually recognizable luminance of the input image signal and a temporal variation Sfrc'(f) in visually recognizable luminance of the frame rate converted image signal.

$$S'(f) = \frac{1}{N} \sum_{ft=0}^{N-1} \text{S\_VTF}(ft) \exp\left(i\frac{2\pi \cdot ft \cdot f}{N}\right) \quad (11)$$

$$Sfrc'(f) = \frac{1}{N} \sum_{ft=0}^{N-1} \text{Sfrc\_VTF}(ft) \exp\left(i\frac{2\pi \cdot ft \cdot f}{N}\right)$$

Figure 12:
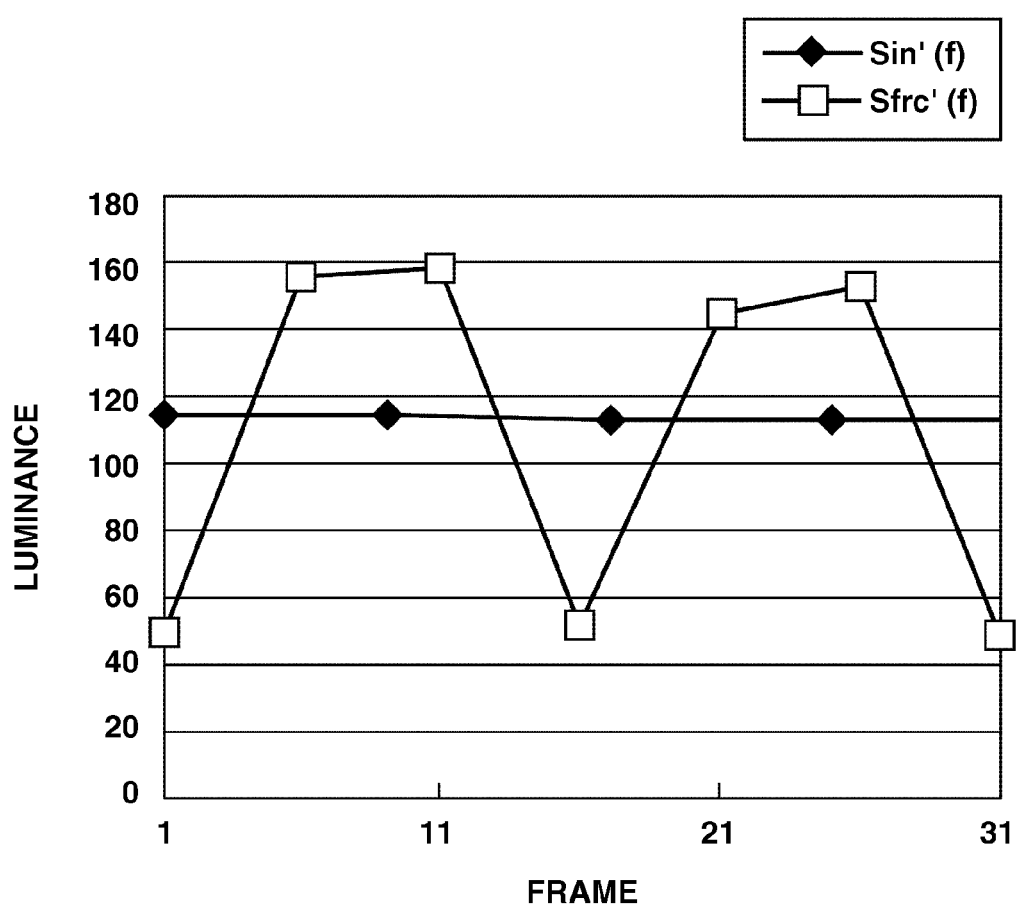
FIG. 12 illustrates normalized temporal changes in visually recognizable luminance of an input image signal and a frame rate converted image signal according to the second exemplary embodiment of the present invention.

FIG. 12 is a graph illustrating S'(f) and Sfrc'(f), in which the abscissa axis represents frame number and the ordinate axis represents luminance. As described above, the visual luminance change acquisition unit 302 of the luminance change detection unit 300 is functionally operable as a third acquisition unit configured to acquire luminance time frequency S'(f) that can be obtained by filtering the frequency that represents temporal changes in luminance of an input signal using visual perceptual response characteristics.

In step S909, the evaluation value acquisition unit 303 of the luminance change detection unit 300 calculates and acquires a luminance change evaluation value C that is an evaluation value for the input image signal and a luminance change evaluation value Cfrc that is an evaluation value for the frame rate converted image signal. The evaluation value acquisition unit 303 calculates the visually recognizable luminance change evaluation value C of the input image signal and the luminance change evaluation value Cfrc of the frame rate converted image signal based on S'(f) and Sfrc'(f).

If the luminance change evaluation value is defined as a difference between a maximum value and a minimum value of the luminance change, C and Cfrc can be obtained using the following formula.

$$C = \max(S'(f)) - \min(S'(f))$$

$$Cfrc = \max(Sfrc'(f)) - \min(Sfrc'(f)) \quad (12)$$

Using the above-described formula (12), the evaluation value acquisition unit 303 calculates a luminance change evaluation value for n frames of the input image signal and a luminance change evaluation value for 60 frames of the frame rate converted image signal.

The method for calculating the above-described luminance change evaluation values is not limited to the above-described method. When the maximum value of the luminance is taken into consideration, it is useful to define the maximum value of the luminance change as the luminance change evaluation value. Further, the following formula can be used to obtain a luminance change relative to the luminance of the screen, as an evaluation value, if the luminance amplitude relative to the average luminance value is employed.

$$C = \frac{\left(\frac{\max(S'(f)) - \min(S'(f))}{2}\right)}{\frac{1}{n} \cdot \sum_{f=1}^{f \to n} S'(f)} \quad (13)$$

n: number of input frames

As described above, the evaluation value acquisition unit 303 of the luminance change detection unit 300 is functionally operable as a first acquisition unit configured to acquire the luminance change evaluation value C that is an evaluation value for the input image signal and a second acquisition unit configured to acquire the luminance change evaluation value Cfrc that is an evaluation value for the frame rate converted image signal.

In the present exemplary embodiment, the frame rate conversion processing apparatus 110 internally processes calculations for the luminance change evaluation value C and the luminance change evaluation value Cfrc. However, it is also useful if an external calculation unit configured to perform the above-described calculation processing is provided outside the frame rate conversion processing apparatus 110. In this case, the evaluation value acquisition unit 303 acquires a calculated temporal variation frequency from the external calculation unit that has performed the calculation processing.

In step S910, the comparison unit 304 of the luminance change detection unit 300 determines whether to calculate the correction target value Ld based on the luminance change evaluation values C and Cfrc acquired in step S908.

When the waveforms of S'(f) and Sfrc'(f) are greatly different from each other as illustrated in FIG. 12 and if an absolute difference between C and Cfrc is equal to or greater than a threshold Cth, the comparison unit 304 determines that the input 60 frames of the frame rate converted image signal is greatly different from actual visibility (YES in step S910). Then, the processing of the luminance change detection unit 300 proceeds to step S911.

Further, if it is determined that the absolute difference between C and Cfrc is smaller than the threshold Cth (NO in step S910), the comparison unit 304 determines that the waveforms of S'(f) and Sfrc'(f) are similar to each other and therefore the frame rate converted image signal resembles the actual visibility. In this case, the processing of the luminance change detection unit 300 proceeds to step S912. In the present exemplary embodiment, the threshold Cth is a visually recognizable luminance difference that can be acquired from the visual perceptual response characteristics storage unit 701. Further, the threshold Cth can be an arbitrary value, which can be designated by a user via an externally provided operation unit.

In step S911, the target value calculation unit 207 of the luminance change detection unit 300 obtains the correction target value Ld(f) that corresponds to the frame number f using the following formula in such a way as to equalize the temporal luminance variation Sfrc(f) of the frame rate converted image signal with actual visibility S'(f). In this case, the frame number f is a number allocated to a frame that constitutes the frame rate converted image signal, which can be calculated based on the output frame rate.

$$Ld(f) = S'(f) \quad (14)$$

In this case, the actual visibility S'(f) is the value calculated by the visual luminance change acquisition unit 302 in step S908 and is an average value of RGB pixels that constitute the entire screen of each frame.

In step S912, the target value transmission unit 208 of the luminance change detection unit 300 transmits a correction inhibition signal to the correction unit 119. In the present exemplary embodiment, the target value calculation unit 207 of the luminance change detection unit 300 designates correction inhibition target frames, in which the total number of the correction inhibition target frames is equal to the number of frames included in the frame rate converted image signal counted in step S903.

In step S913, the target value transmission unit 208 transmits the correction target value Ld(f) obtained in step S911 to the correction unit 119. In the present exemplary embodiment, the luminance change detection unit 300 transmits the correction target value Ld(f) for correction target frames, in which the total number of the correction target frames is equal to the number of frames included in the frame rate converted image signal obtained in step S903.

The correction unit 119 corrects a frame of the frame rate converted image signal that has an output order corresponding to the frame number f, using the correction target value Ld(f) transmitted from the luminance change detection unit 300. Then, the correction unit 119 transmits, as an output image signal, corrected frames of the frame rate converted image signal.

Further, if the correction unit 119 receives the correction inhibition signal from the luminance change detection unit 300, the correction unit 119 does not perform correction processing on the corresponding frames of the frame rate converted image signal and directly transmits these frames as the output image. Thus, the frame rate conversion processing apparatus 110 according to the present exemplary embodiment can equalize luminance changes occurring in the output image signal with actual visibility.

The correction processing is described in more detail. First, the correction unit 119 calculates the luminance value L for each of a correction target frame and some of preceding and following frames, which are included in the input image signal, using the formula (1). Then, the correction unit 119 transmits a frame that is smallest in the absolute value of the difference between Ld(f) and L, instead of transmitting the frame of the frame rate converted image signal.

Further, if the correction unit 119 receives the correction inhibition signal, the correction unit 119 directly transmits frames having the output order that corresponds to the count of the correction inhibition signal, as the output image signal, without correcting these frames.

The correction method is not limited to the above-described method. It may be useful to generate a signal value of Ld(f) without performing the above-described search processing and transmit the generated signal value, instead of transmitting the corresponding frame. Numerical values used in the above-described exemplary embodiment are mere numerical examples and any other values can be appropriately set considering the type of an image or according to a user's operation.

According to the above-described configuration, the correction method can be determined by calculating the evaluation value C of the input image signal and the evaluation value Cfrc of the frame rate converted image signal (see step S909 illustrated in FIG. 9) and comparing the difference between C and Cfrc with the predetermined value (see step S910).

However, the frame rate conversion processing according to the present invention is not limited to the above-described processing. It may be useful to perform frame rate conversion and correct the frame rate converted image signal instead of calculating the evaluation values and selecting the correction method. More specifically, it may be useful to set the temporal variation S'(f) in visually recognizable luminance of the input image signal (i.e., the value calculated in step S908) as the correction target value Ld(f) and correct the input image signal in such a way that the temporal luminance variation of the input image signal satisfies the condition S(f)=S'(f). Then, the frame rate conversion is performed.

Thus, even if an input image signal includes luminance changes whose time frequency is visually unrecognizable, the frame rate conversion is performed after temporal luminance changes are smoothened as indicated by S(f) illustrated in FIG. 12. Therefore, a video obtained through the frame conversion processing can be prevented from becoming visually unnatural.

Performing the above-described processing and control enables to correct a frame rate converted image so as to have visibility similar to actual visibility. Accordingly, the frame rate conversion processing apparatus according to the present exemplary embodiment can prevent an object that is constantly emitting stable light from being recognized as if its luminance is temporally changing in a frame conversion processed video.

Further, the frame rate conversion processing apparatus according to the present exemplary embodiment can prevent an object whose luminance is temporally changing from being recognized as if it is constantly emitting stable light in a frame conversion processed video.

Further, in the present exemplary embodiment, the frame rate conversion processing apparatus performs correction when the luminance of a frame rate converted image signal changes differently compared to actual visibility. However, it is useful that frame rate conversion processing apparatus perform the above-described correction processing even in a case where a frame rate converted image signal is excessively darker or brighter compared to actual visibility. As described above, the frame rate conversion processing apparatus according to the present exemplary embodiment can prevent a frame conversion processed video from being recognized as being visually unnatural.

Processing according to another exemplary embodiment includes correction to be performed when area detection is performed in the luminance change detection and the luminance changes partly in a frame, as described below. Compared to the frame rate conversion processing apparatus described in the second exemplary embodiment, a frame rate conversion processing apparatus according to the present exemplary embodiment can correct a part of a frame included in the input image signal, as described below.

Figure 13A:
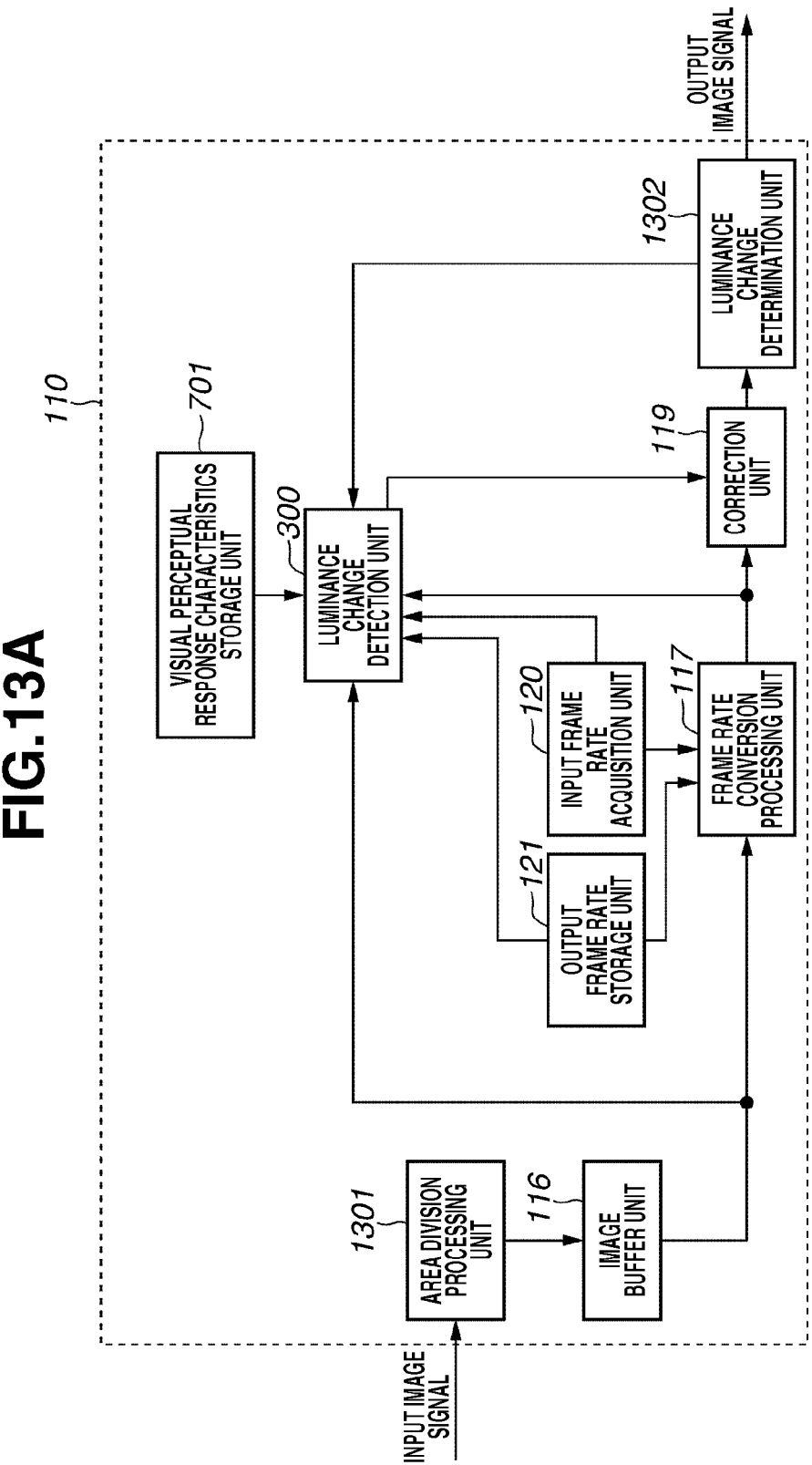
FIG. 13A is a block diagram illustrating a configuration of a frame rate conversion processing apparatus according to a third exemplary embodiment of the present invention.

FIG. 13A is a block diagram illustrating an example configuration of the frame rate conversion processing apparatus 110 according to the present exemplary embodiment. The frame rate conversion processing apparatus 110 includes a frame rate conversion processing unit 117, a correction unit 119, an input frame rate acquisition unit 120, and an output frame rate storage unit 121, which are similar to those described in the first exemplary embodiment and therefore the descriptions thereof are not repeated.

The frame rate conversion processing apparatus 110 illustrated in FIG. 13A includes an area division processing unit 1301 that can divide all frames of an input image signal into a plurality of blocks. For example, each divided block is composed of 128×128 pixels. In the present exemplary embodiment, it is presumed that one frame of the input image signal has a resolution of 512×384 pixels and the area division processing unit 1301 can divide each frame into 4×3 blocks.

The area division processing unit 1301 can transmit the divided blocks of each frame of the input image signal to the image buffer unit 116. Thus, the area division processing unit 1301 is functionally operable as an area division unit configured to divide each frame of an input signal into a plurality of areas. The image buffer unit 116 temporarily stores the image signal received from the area division processing unit 1301 on frame-by-frame basis. Further, the image buffer unit 116 can transmit the stored image signal to the frame rate conversion processing unit 117 and the luminance change detection unit 300 according to a reading command.

The luminance change detection unit 300 can calculate a target value of temporal changes in luminance of an output image signal based on the temporal changes in luminance of the input image signal received from the buffer unit 116 and outputs the target value to the correction unit 119.

Figure 13B:
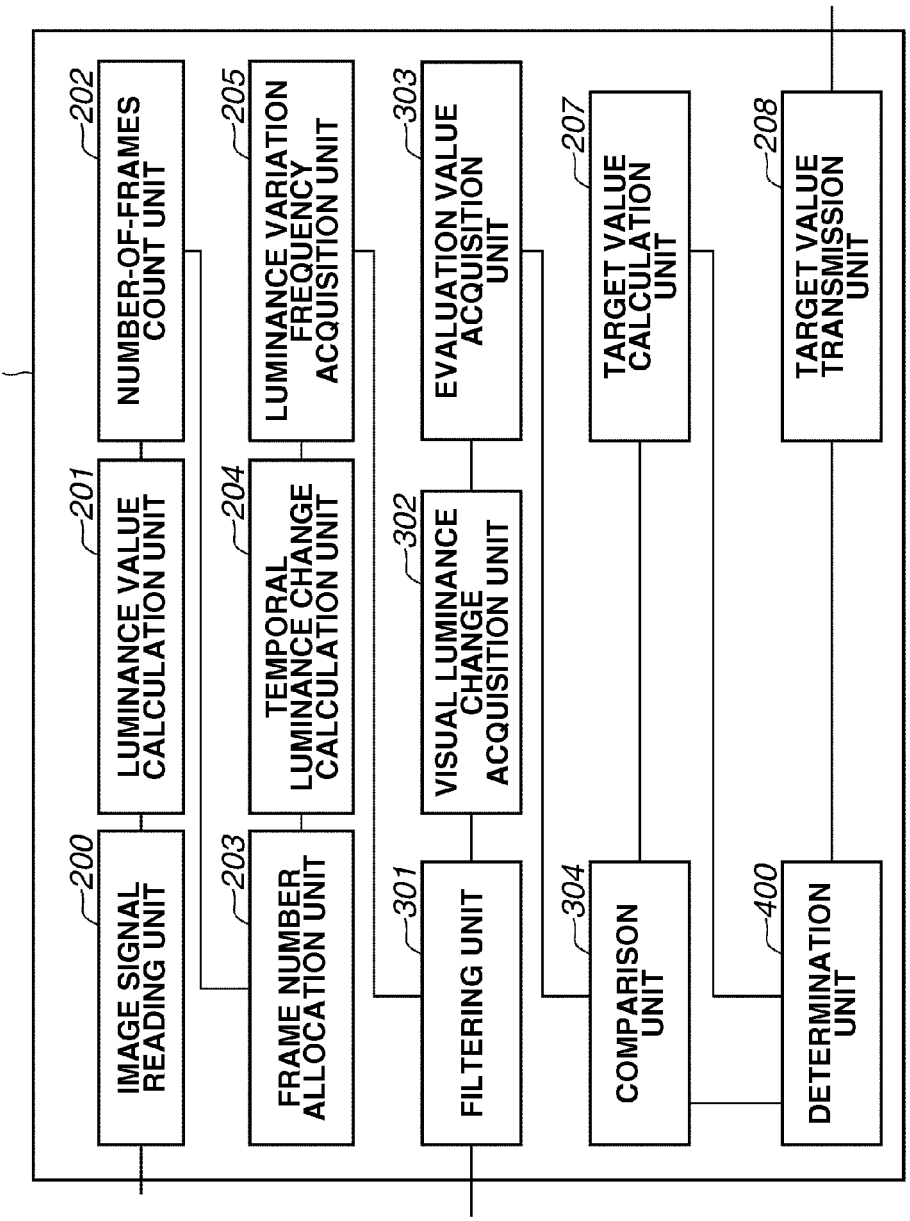
FIG. 13B is a functional block diagram illustrating a luminance change detection unit according to the third exemplary embodiment of the present invention.

FIG. 13B is a functional block diagram illustrating the luminance change detection unit 300. The luminance change detection unit 300 illustrated in FIG. 13B includes an image signal reading unit 200, a luminance value calculation unit 201, a number-of-frames count unit 202, a frame number allocation unit 203, a temporal luminance change calculation unit 204, and a luminance variation frequency acquisition unit 205, which are similar to those described in the second exemplary embodiment. The luminance change detection unit 300 illustrated in FIG. 13B further includes a filtering unit 301, a visual luminance change acquisition unit 302, an evaluation value acquisition unit 303, and a comparison unit 304, which are similar to those described in the second exemplary embodiment. Moreover, the luminance change detection unit 300 illustrated in FIG. 13B includes a target value calculation unit 207 that is similar to that described in the second exemplary embodiment. Therefore, descriptions of the above-described constituent components are not repeated.

The luminance change detection unit 300 illustrated in FIG. 13B additionally includes a determination unit 400 that can determine whether the determination processing by the comparison unit 304 is completed for all of 4×3 blocks that constitute a frame of a frame rate converted image signal. If the determination unit 400 determines that the determination processing is completed for all blocks of a target frame of the frame rate converted image signal, the determination unit 400 transmits the target value of the frame to the target value transmission unit 208. Then, the target value transmission unit 208 outputs the input target value to the correction unit 119.

Next, an overall operation that can be performed by the frame rate conversion processing apparatus 110 is described below. If the frame rate conversion processing apparatus 110 receives an input image signal, the area division processing unit 1301 divides each frame of the input signal into a plurality of blocks. Subsequently, the image buffer unit 116 temporarily stores the divided blocks of the frames. Then, the image buffer unit 116 transmits the temporarily stored input image signal to the frame rate conversion processing unit 117 and the luminance change detection unit 300 according to a reading command.

The frame rate conversion processing unit 117 performs thinning and interpolation processing on frames of the input image signal read from the image buffer unit 116 so that that the input image signal read from the image buffer unit 116 has a converted frame rate similar to a frame rate of the output image signal.

The luminance change detection unit 300 causes the temporal luminance change calculation unit 204 to detect changes in luminance of the input image signal received from the image buffer unit 116. Then, the luminance change detection unit 300 calculates a correction target value Ld(f) for the frame rate converted image signal.

Similar to the second exemplary embodiment, a processor and a memory, which are built in the luminance change detection unit 300, can cooperatively realize each functional block illustrated in FIG. 13B. The processor built in the luminance change detection unit 300 is a computer, which can execute a program read from the memory built in the luminance change detection unit 300.

The memory built in the luminance change detection unit 300 is a storage medium capable of storing the program that the processor can read. However, it is also useful to provide a hardware configuration capable of realizing each functional block illustrated in FIG. 13B.

FIG. 14 is a flowchart illustrating a flow of processing that can be performed by the luminance change detection unit 300. In step S1401, the image signal reading unit 200 of the luminance change detection unit 300 outputs a reading command to each of the image buffer unit 116 and the frame rate conversion processing unit 117.

Then, the luminance change detection unit 300 obtains n frames of the input image signal and m frames of the frame rate converted image signal. Each frame includes 4×3 blocks. In this case, n and m are arbitrary values that are equal to or greater than 1. Further, m represents the number of frames of the frame rate converted image signal, which are included in n frames.

Processing to be performed in step S1402 to step S1409 is similar to the processing performed in step S902 to step S909 described in the second exemplary embodiment and therefore descriptions thereof are not repeated. However, the luminance change detection unit 300 calculates temporal luminance variations S(f) and Sfrc(f), visually recognizable luminance variations S'(f) and Sfrc'(f), and luminance change evaluation values C and Cfrc for each of the 4×3 blocks.

In step S1410, the comparison unit 304 of the luminance change detection unit 300 determines whether to calculate a correction target value Ld based on the luminance change evaluation values C and Cfrc for an arbitrary block f of the m frames of the input frame rate converted image signal.

The determination processing to be performed in step S1410 is similar to the determination processing performed in step S910. If it is determined that the absolute difference between C and Cfrc is equal to or greater than Cth (YES in step S1410), the processing proceeds to step S1411. If it is determined that the absolute difference between C and Cfrc is smaller than Cth (NO in step S1410), the processing proceeds to step S1412.

In step S1411, the target value calculation unit 207 of the luminance change detection unit 300 calculates a correction target value Ld(f) for each frame of the corresponding block. The processing to be performed in step S1411 is similar to the processing performed in step S911 in calculation method and therefore descriptions thereof are not repeated.

In step S1412, the target value calculation unit 207 of the luminance change detection unit 300 sets a correction inhibition signal as the correction target value Ld(f) for each frame of the corresponding block.

In step S1413, the determination unit 400 of the luminance change detection unit 300 determines whether the determination processing of step S1410 has been completed for all of the 4×3 blocks that constitute each of m frames included in the frame rate converted image signal. If it is determined that the processing has not been completed for all blocks (NO in step S1413), the processing proceeds to step S1414. If it is determined that the processing has been completed for all blocks (YES in step S1413), the processing proceeds to step S1415.

In step S1414, the comparison unit 304 and the target value calculation unit 207 of the luminance change detection unit 300 shifts the target block to a subsequent block that is not subjected to the determination processing in step S1410, and determines a correction method and calculates a correction target value Ld(f).

In step S1415, the target value transmission unit 208 of the luminance change detection unit 300 transmits the correction target value Ld(f) to the correction unit 119 for all of the 4×3 blocks that constitute each of m frames included in the frame rate converted image signal. In the present exemplary embodiment, the luminance change detection unit 300 transmits the correction target value Ld(f) for target frames, in which the total number of the target frames is equal to the number of frames included in the frame rate converted image signal obtained in step S1403.

In the present exemplary embodiment, Ld(f) is obtained for each block. However, it may also be useful to calculate Ld(f) for each pixel, similar to the above-described processing.

Then, the correction unit 119 illustrated in FIG. 13A corrects the frame rate converted image signal using the correction target value Ld(f) acquired from the luminance change detection unit 300, and transmits the corrected frame rate converted image signal, as an output image signal, to a luminance change determination unit 1302.

First, if there is any value allocated to a block as the correction target value Ld(f), the correction unit 119 corrects a frame of the frame rate converted image signal that corresponds to the frame number f among m frames included in the frame rate converted image signal of the target block, and outputs the corrected frames as an output image signal.

Further, if the correction target value Ld(f) is the correction inhibition signal, the correction unit 119 does not correct m frames included in the frame rate converted image signal of the target block and directly transmits these frames, as an output image signal, to the luminance change determination unit 1302. Detailed content of the correction processing to be performed by the correction unit 119 is similar to that described in the second exemplary embodiment and therefore the description thereof is not repeated.

The luminance change determination unit 1302 illustrated in FIG. 13 calculates a luminance change evaluation value for the frame rate converted image signal that has been corrected by the correction unit 119. Then, the luminance change determination unit 1302 determines whether the correction has been performed appropriately.

More specifically, the luminance change determination unit 1302 calculates temporal variation Sfrc2'(f) in visually recognizable luminance based on a temporal variation Sfrc2 (f) of a designated block of the frame rate converted image signal, which has been subjected to the correction processing, using the formulae (9) to (11). Then, the luminance change determination unit 1302 calculates a luminance change evaluation value Cfrc2 using the formula (12).

Next, the luminance change determination unit 1302 compares the obtained luminance change evaluation value Cfrc2 with the threshold Cth, which has been used in step S910. If in all of the 4×3 blocks the luminance change evaluation value Cfrc2 is equal to or less than the threshold Cth, the luminance change determination unit 1302 outputs the corrected frame rate converted image signal as an output image signal.

If as a result of the comparison there is any block that satisfies the condition that Cfrc2 is greater than Cth, the luminance change determination unit 1302 transmits Sfrc2(f) of all frames included in the corrected frame rate converted image signal, as Sfrc(f), to the luminance change detection unit 300 and obtains the correction target value Ld(f) again. When the correction target value Ld(f) is obtained again, it is desired to appropriately combine some of the 4×3 blocks to reduce the total number of blocks (e.g., 2×3 blocks), so that each block has a wider area.

However, the method according to which the luminance change detection unit 300 performs the processing again is not limited to the above-described method. It may be useful to increase the number of frames of the input image signal, for example from n frames to (n+n') frames, when the luminance change detection unit 300 performs the processing again, instead of using Sfrc2. In this case, n' is an arbitrary value. The threshold Cth can be an arbitrary value, which can be acquired by the visual perceptual response characteristics storage unit 701 according to the output frame rate value.

As described above, as the luminance change determination unit 1302 determines whether the correction has been performed appropriately, the frame rate conversion processing apparatus 110 can generate an output image signal so as to fully reproduce visually recognizable changes in luminance of a captured subject.

The luminance change determination unit 1302 can be omitted if it is unnecessary. It may be useful that an output image signal of the frame rate conversion processing apparatus 110 is the image signal output from the correction unit 119.

As another exemplary embodiment, it may be useful to divide each frame and perform frequency comparison and correction processing on each divided frame in a case where the frame rate conversion processing apparatus calculates a frequency that represents temporal changes in luminance of an input image signal, compares the calculated frequency with a predetermined frequency, and performs correction processing based on a comparison result, as described in the first exemplary embodiment.

Performing the above-described processing and control can visually reproduce luminance changes that occur partly in a frame. Further, performing the above-described processing and control can naturally reproduce visually recognizable changes in luminance of a moving object because correction of luminance changes is performed for each area.

Figure 15A:
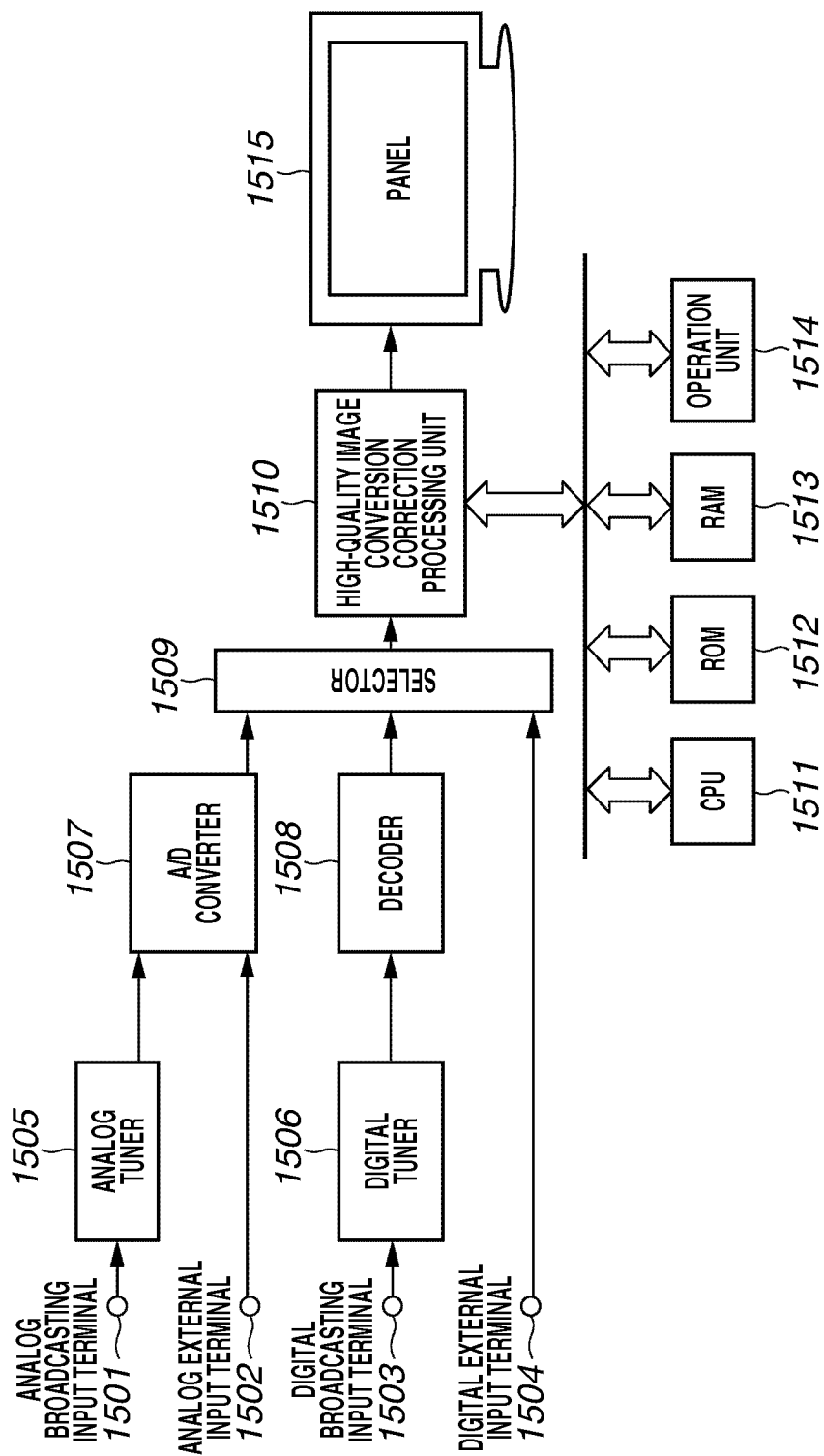
FIGS. 15A and 15B are block diagrams illustrating an image processing apparatus of an imaging apparatus, which includes a frame rate conversion processing apparatus according to a fourth exemplary embodiment of the present invention.

A frame rate conversion processing apparatus according to the present invention can be applied to an image display apparatus or a recording apparatus. FIG. 15A illustrates a frame rate conversion processing apparatus according to an exemplary embodiment of the present invention, which can be applied to an image display apparatus.

In FIG. 15A, an analog broadcasting input terminal 1501 is an input terminal dedicated to an analog broadcasting signal, such as an analog terrestrial broadcasting signal or an analog satellite broadcasting signal. An analog external input terminal 1502 is, for example, a D terminal dedicated to an analog video signal. A digital broadcasting input terminal 1503 is an input terminal dedicated to a digital broadcasting signal, such as a digital terrestrial broadcasting or a digital satellite broadcasting signal. A digital external input terminal 1504 is an input terminal dedicated to a digital video signal, such as a High-Definition Multimedia Interface (HDMI) signal. These input terminals are functionally operable as an input unit configured to input an input image signal.

An analog tuner 1505 can convert an analog broadcasting signal input via the analog broadcasting input terminal 1501 into a video signal and output the converted video signal to an analog-digital (A/D) converter 1507. A digital tuner 1506 can convert a digital broadcasting signal input via the digital broadcasting input terminal 1503 into a video signal and output the converted video signal to a decoder 1508.

The A/D converter 1507 can convert an analog video signal received from the analog tuner 1505 or an analog video signal input from the analog external input terminal 1502 into a digital video signal. The decoder 1508 can receive a video signal from the digital tuner 1506 and decode the received video signal into a Moving Picture Experts Group (MPEG) signal or another encoded video signal.

A selector 1509 can select any one of an A/D converted video signal received from the A/D converter 1507, a decoded video signal received from the decoder 1508, and a digital video signal received from the digital external input terminal 1504. Further, the selector 1509 can transmit the selected signal to a high-quality image conversion correction processing unit 1510.

The high-quality image conversion correction processing unit 1510 can perform high-quality image processing and correction processing on an input video signal based on a given parameter. The frame rate conversion processing apparatus 110 described in the first, second, or third exemplary embodiment is built in the high-quality image conversion correction processing unit 1510.

A central processing unit (CPU) 1511 can perform calculations and controls for the above-described sequential processing. A read only memory (ROM) 1512 and a random access memory (RAM) 1513 store programs and data that are required when the CPU 1511 executes various processing. Further, the above-described memory can provide a work area for the CPU 1511. An operation unit 1514 is a device that enables users to input an instruction to a display device. For example, the operation unit 1514 includes buttons and a touch panel. A panel 1515 is an image display device that can display an output image signal received from the high-quality image conversion correction processing unit 1510.

The frame rate conversion processing apparatus 110 provided in the high-quality image conversion correction processing unit 1510 executes frame rate conversion processing as described in the first exemplary embodiment, the second exemplary embodiment, or the third exemplary embodiment. Alternatively, the frame rate conversion processing apparatus 110 acquires a drive frequency of the panel 1515 and equalizes a frame rate of an input image signal with the drive frequency of the panel 1515.

In the present exemplary embodiment, the drive frequency is equivalent to vertical synchronization frequency or frame rate of the panel 1515. A panel drive voltage detection sensor (not illustrated), which is located at a predetermined display position of the panel 1515, can be used to acquire the drive frequency of the panel 1515.

The panel drive voltage detection sensor includes a terminal that can acquire a drive voltage from an external device and can acquire a time interval of the drive voltage of the panel 1515, and calculates a drive frequency. The panel drive voltage detection sensor acquires a time interval t1 during which the drive voltage exceeds a threshold Th. The time interval t1 is a drive period of the panel 1515. Therefore, the panel drive voltage detection sensor can calculate a drive frequency Fp using the following formula.

$$Fp = 1/t1 \quad (15)$$

In the formula (15), the time interval t1 is a numerical value expressed using the unit of "sec."

The method for acquiring the time interval is not limited to the above-described method. For example, in a case where two or more time intervals, during which a temporal change of the drive voltage exceeds the threshold Th, are acquired, it may be useful to designate the shortest time interval as the drive period of the panel 1515 and calculate the drive frequency Fp using the formula (15).

Further, it may be useful to provide a plurality of panel drive voltage detection sensors in the panel 1515. Further, the drive frequency acquisition method is not limited to the above-described method. The panel drive voltage detection sensor can be a photo sensor that can detect light emitted from the panel 1515, instead of detecting the drive voltage. As another method, a user can input drive voltage information via the operation unit 1514.

Further, it is useful to acquire a stored value that represents the drive frequency of the panel 1515 from the ROM 1512. As described above, the panel drive voltage detection sensor is functionally operable as a drive frequency acquisition unit configured to acquire a drive frequency of a display unit that displays an output image signal.

The output frame rate storage unit 121 stores the drive frequency Fp, if it is obtained as described above, as a frame rate of the frame rate converted image signal. Hereinafter, the frame rate conversion processing apparatus 110 performs frame rate conversion processing so as to equalize the drive frequency of the panel 1515 with the frame rate of the frame rate converted image signal, as described in the first, second, or third exemplary embodiment. Thus, a video having been subjected to the frame conversion processing can be prevented from becoming visually unnatural.

In the present exemplary embodiment, the luminance value is an RGB pixel value. However, similar effects can be obtained if the panel 1515 holds a profile and when a Y value (i.e., one of XYZ values) that corresponds to an RGB pixel value is usable as a luminance value.

Figure 15B:
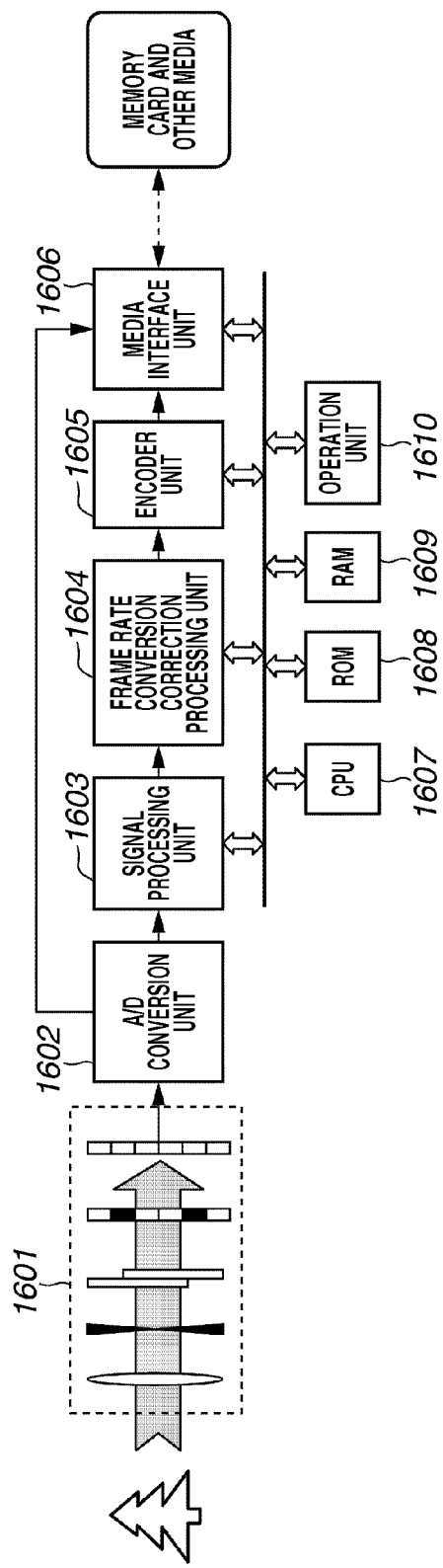
Figure 16A:
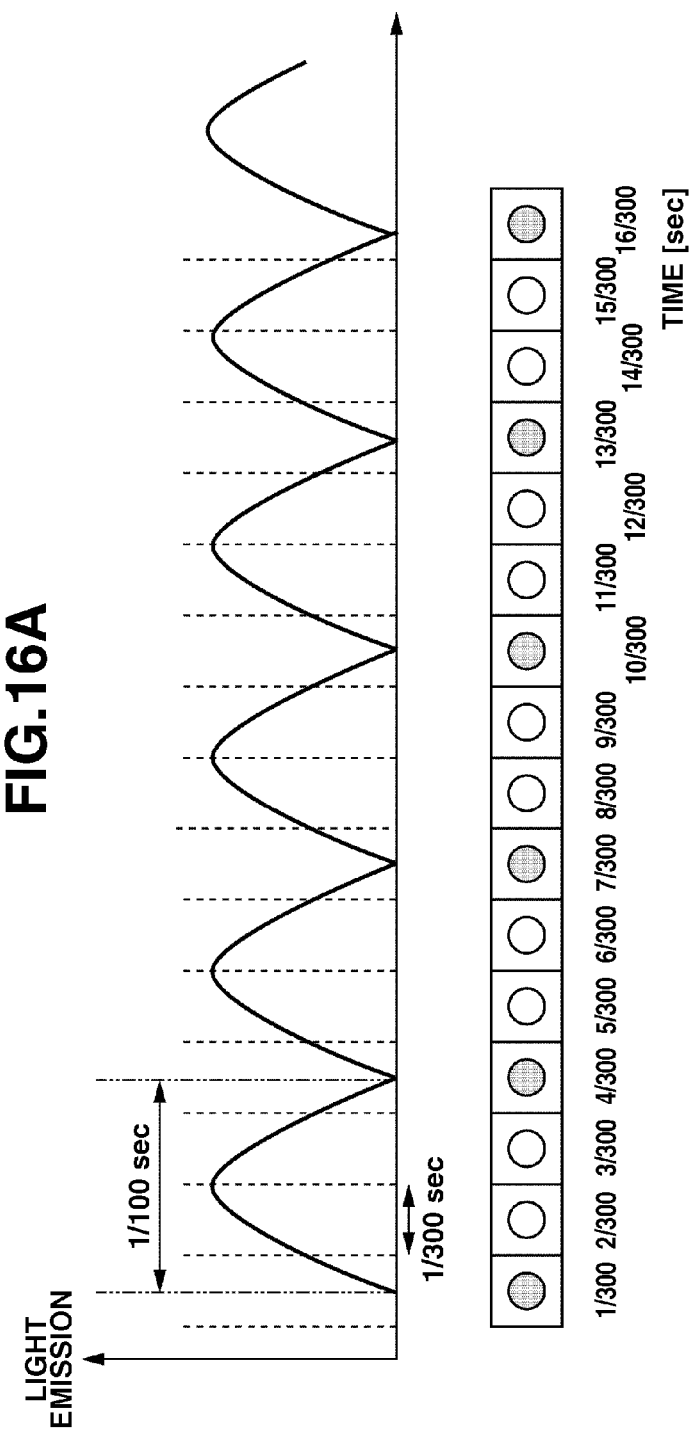
FIGS. 16A and 16B illustrate an example row of frames that represents changes in luminance of a captured subject, together with a row of frames having been subjected to frame rate conversion.
Figure 16B:
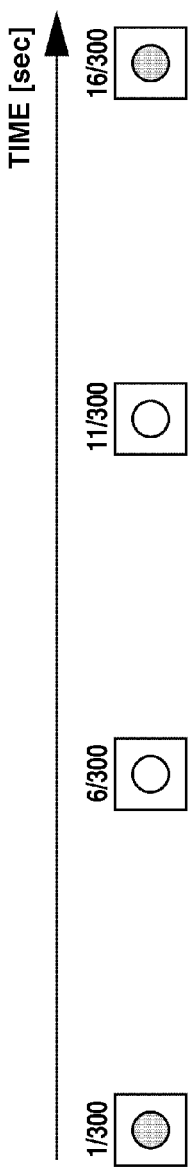

According to another exemplary embodiment, a frame rate conversion processing apparatus according to the present invention is applicable to a recording apparatus, as described below. FIG. 15B illustrates an example of an image processing apparatus of an imaging apparatus that includes a frame rate conversion processing apparatus according to the present invention.

In FIG. 15B, an imaging unit 1601 is an optical device that can detect light from a captured subject. For example, the imaging unit 1601 includes a zoom lens, a focus lens, a blur correction lens, a diaphragm, a shutter, an optical low-pass filter, an iR cut filter, a color filter, and a Complementary Metal Oxide Semiconductor (CMOS) or a Charge Coupled Device (CCD) sensor.

An A/D conversion unit 1602 is a functional unit configured to generate a digital data that represents a detected amount of light from the captured subject. A signal processing unit 1603 is a functional unit configured to perform signal processing on the above-described digital data and generate a digital image. For example, the signal processing that can be performed by the signal processing unit 1603 includes demosaicing processing, white balance processing, and gamma processing.

A frame rate conversion correction processing unit 1604 performs frame rate conversion processing on an input image signal and performs correction processing so as to equalize luminance changes with actual visibility. An internal configuration of the frame rate conversion correction processing unit 1604 is similar to the configuration illustrated in FIG. 1A, FIG. 7A, or FIG. 13A and therefore the description thereof is not repeated.

An encoder unit 1605 is a functional unit configured to perform data compression processing on the above-described digital image. For example, the processing that can be performed by the encoder unit 1605 includes JPEG compression processing. A media interface unit 1606 is a functionally operable as an interface connected to a memory card or any other media (e.g., a hard disk, a memory card, a CF card, an SD card, and a USB memory).

A CPU 1607 performs calculations and controls for sequential processing to be performed by the above-described constituent components. A ROM 1608 and a RAM 1609 store programs and data that are required when the CPU 1607 executes various processing and can provide a work area for the CPU 1607. If a control program required in the following processing is stored in the ROM 1608, the control program is once loaded into the RAM 1609 and executed by the CPU 1607.

An operation unit 1610 is a device that enables users to input instructions. For example, the operation unit 1610 is a button or a mode dial. The apparatus configuration is not limited to the above-described one. The present invention is applicable to an integrated system that includes a plurality of devices (e.g., a host computer, an interface device, a reader, and a printer) and is also applicable to a single device (e.g., a copying machine or a facsimile apparatus).

The above-described apparatus can convert a frame rate of an image captured by the imaging apparatus and correct temporal changes in luminance before the image data is recorded into a memory card.

The image display apparatus according to the above-described exemplary embodiment can be used to read image data from the memory card while converting the frame rate of the data.

The storage medium used in the above-described exemplary embodiment is a memory card. However, any other medium, such as an optical disk or a magnetic storage medium, is employable as a storage medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-049314 filed. Mar. 5, 2010, which is hereby incorporated by reference herein in its entirety.

What is claimed is:

1. A frame rate conversion processing apparatus that converts an input image signal having a first frame rate into a converted image signal having a second frame rate, in which the second frame rate is lower than the first frame rate, the frame rate conversion processing apparatus comprising:
    a detection unit configured to detect a frequency of temporal changes in luminance of the input image signal; and
    an outputting unit configured to output, when the detection unit detects that the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and to output, when the detection unit detects that the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

2. The frame rate conversion processing apparatus according to claim 1, wherein
    the detection unit detects an amplitude temporal changes in luminance of the input image signal; and
    the outputting unit outputs, when the detection unit detects that the frequency of the temporal changes exceeds the predetermined frequency and the amplitude of the temporal changes in luminance of the input image signal is less than a predetermined amplitude, the converted image signal having the second frame rate of which temporal changes are controlled so as to prevent the temporal changes in luminance of the converted image signal from being perceived by human eyes.

3. The frame rate conversion processing apparatus according to claim 1, further comprising:
    an area division unit configured to divide each frame of the input image signal into a plurality of areas,
    wherein frame rate conversion processing is performed for each of the areas divided by the area division unit.

4. The frame rate conversion processing apparatus according to claim 1, further comprising:
    a drive frequency acquisition unit configured to acquire a drive frequency of a display unit that displays the converted image signal,
    wherein frame rate conversion processing is performed so as to equalize the drive frequency acquired by the drive frequency acquisition unit with the frame rate of the converted image signal.

5. An image display apparatus comprising:
    an input unit configured to input an input image signal;
    a display unit configured to display a converted image signal; and
    the frame rate conversion processing apparatus according to claim 4.

6. The frame rate conversion processing apparatus according to claim 1, wherein
    the outputting unit outputs, when the detection unit detects that the frequency of the temporal changes in luminance of the input image signal exceeds a predetermined frequency of temporal changes in luminance that can be perceived by human eyes, the converted image signal having the second frame rate by correcting the luminance of frames included in the converted image signal having the second frame rate based on the average luminance value of the luminance of frames included in the converted image signal.

7. The frame rate conversion processing apparatus according to claim 1, further comprising:
    a storage unit configured to store the second frame rate;
    wherein the outputting unit outputs the converted image signal at the second frame rate stored in the storage unit.

8. A frame rate conversion processing apparatus that converts an input image signal having a first frame rate into a frame rate converted image signal having a second frame rate, in which the second frame rate is lower than the first frame rate, and then generates an output image signal having the second frame rate based on the frame rate converted image signal, the frame rate conversion processing apparatus comprising:
  a first acquisition unit configured to acquire a first evaluation value for the input image signal, which can be calculated based on a frequency that represents temporal changes in luminance of the input image signal and visual perceptual response characteristics;
  a second acquisition unit configured to acquire a second evaluation value for the frame rate converted image signal, which can be calculated based on a frequency that represents temporal changes in luminance of the frame rate converted image signal and the visual perceptual response characteristics;
  a third acquisition unit configured to acquire a frequency that represents temporal changes in luminance, which can be obtained by filtering the frequency that represents temporal changes in luminance of the input image signal using the visual perceptual response characteristics;
  a comparison unit configured to compare a difference between the evaluation value acquired by the first acquisition unit and the evaluation value acquired by the second acquisition unit with a predetermined value; and
  a generation unit configured to generate the output image signal by correcting the frame rate converted image signal using the filtered frequency that represents temporal changes in luminance acquired by the third acquisition unit, as a correction target value of the frequency that represents temporal changes in luminance, when the comparison unit determines that a difference between the first evaluation value and the second evaluation value exceeds the predetermined value.

9. The frame rate conversion processing apparatus according to claim 8, further comprising:
  a filtering unit configured to filter the frequency that represents temporal changes in luminance of the input image signal and the frequency that represents temporal changes in luminance of the frame rate converted image signal using the visual perceptual response characteristics,
  wherein the first acquisition unit is configured to acquire, as the evaluation value, an amplitude of the temporal variations that can be obtained through the filtering performed by the filtering unit to filter the frequency that represents temporal changes in luminance of the input image signal, and
  the second acquisition unit is configured to acquire, as the evaluation value, an amplitude of the temporal variations that can be obtained through the filtering performed by the filtering unit to filter the frequency that represents temporal changes in luminance of the frame rate converted image signal.

10. A frame rate conversion processing apparatus that converts an input image signal having a first frame rate into a converted image signal having a second frame rate, in which the second frame rate is lower than the first frame rate, the frame rate conversion processing apparatus comprising:
  a filtering unit configured to filter a frequency that represents temporal changes in luminance of the input image signal using visual perceptual response characteristics;
  a correction unit configured to correct the input image signal, based on the filtered frequency that represents a frequency of the temporal changes in luminance of the input image signal perceived by the human eyes, using the frequency that represents temporal changes in luminance, which can be obtained through the filtering performed by the filtering unit to filter the frequency that represents temporal changes in luminance of the input image signal, as a correction target value of the frequency that represents temporal changes in luminance;
  a conversion unit configured to convert the input image signal corrected by the correction unit into the converted image signal having the second frame rate and
  an outputting unit configured to output, when the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and to output, when the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

11. A frame rate conversion processing method for converting an input image signal having a first frame rate into a converted image signal having a second frame rate, in which the second frame rate is lower than the first frame rate, the method comprising:
  causing a detection unit to detect a frequency of temporal changes in luminance of the input image signal; and
  causing an outputting unit to output, when it is detected that the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and to output, when it is detected that the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

12. A frame rate conversion processing method for converting an input image signal having a first frame rate into a frame rate converted image signal having a second frame rate, in which the second frame rate is lower than the first frame rate, and then generating an output image signal having the second frame rate based on the frame rate converted image signal,
  causing a first acquisition unit to acquire a first evaluation value for the input image signal, which can be calculated based on a frequency that represents temporal changes in luminance of the input image signal and visual perceptual response characteristics;
  causing a second acquisition unit to acquire a second evaluation value for the frame rate converted image signal, which can be calculated based on a frequency that represents temporal changes in luminance of the frame rate converted image signal and the visual perceptual response characteristics; and causing a third acquisition unit to acquire a frequency that represents temporal changes in luminance, which can be obtained by filtering the frequency that represents temporal changes in luminance of the input image signal using the visual perceptual response characteristics;

causing a comparison unit to compare a difference between the evaluation value acquired by the first acquisition unit and the evaluation value acquired by the second acquisition unit with a predetermined value; and causing a correction unit to generate the output image signal by correcting the frame rate converted image signal using the filtered frequency that represents temporal changes in luminance acquired by the third acquisition unit, as a correction target value of the frequency that represents temporal changes in luminance, when it is determined that a difference between the first evaluation value and the second evaluation value exceeds the predetermined value.

13. A frame rate conversion processing method for converting an input image signal having a first frame rate into a converted image signal having a second frame rate, in which the second frame rate is lower than the first frame rate, the method comprising:

causing a filtering unit to filter a frequency that represents temporal changes in luminance of the input image signal using visual perceptual response characteristics;

causing a correction unit to correct, based on the filtered frequency that represents a frequency of the temporal changes in luminance of input image signal perceived by the human eyes using the frequency that represents temporal changes in luminance, which can be obtained through the filtering performed by the filtering unit to filter the frequency that represents temporal changes in luminance of the input image signal, as a correction target value of the frequency that represents temporal changes in luminance;

causing a conversion unit to convert the input image signal corrected by the correction unit into the converted image signal having the second frame rate and causing an outputting unit to output, when the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and to output, when the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

14. A non-transitory computer readable storage medium storing a program that causes a computer to convert an input image signal having a first frame rate into a converted image signal having a second frame rate, in which the second frame rate is lower than the first frame rate, the program comprising:

computer-executable instructions for detecting a frequency of temporal changes in luminance of the input image signal; and computer-executable instructions for outputting, when it is detected that the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and to output, when it is detected that the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

15. A non-transitory computer readable storage medium storing a program that causes a computer to convert an input image signal having a first frame rate into a frame rate converted image signal having a second frame rate, in which the second frame rate is lower than the first frame rate, and then generate an output image signal having the second frame rate based on the frame rate converted image signal, the program comprising:

computer-executable instructions for acquiring a first evaluation value for the input image signal that can be calculated based on a frequency that represents temporal changes in luminance of the input image signal and visual perceptual response characteristics;

computer-executable instructions for acquiring a second evaluation value for the frame rate converted image signal, which can be calculated based on a frequency that represents temporal changes in luminance of the frame rate converted image signal and the visual perceptual response characteristics;

computer-executable instructions for acquiring a frequency that represents temporal changes in luminance, which can be obtained by filtering the frequency that represents temporal changes in luminance of the input image signal using the visual perceptual response characteristics;

computer-executable instructions for comparing a difference between the first evaluation value and the second evaluation value with predetermined value; and computer-executable instructions for generating the output image signal by correcting the frame rate converted image signal using the frequency that represents temporal changes in luminance obtained through the filtering as a correction target value of the frequency that represents temporal changes in luminance, when it is determined that a difference between the first evaluation value and the second evaluation value exceeds the predetermined value.

16. A non-transitory computer readable storage medium storing a program that causes a computer to convert an input image signal having a first frame rate into a converted image signal having a second frame rate, in which the second frame rate is lower than the first frame rate, the program comprising:

computer-executable instructions for filtering a frequency that represents temporal changes in luminance of the input image signal using visual perceptual response characteristics;

computer-executable instructions for correcting, based on the filtered frequency that represents a frequency of the temporal changes in luminance of input image signal perceived by the human eyes, using the frequency that represents temporal changes in luminance, which can be obtained through the filtering performed on the frequency that represents temporal changes in luminance of the input image signal, as a correction target value of the frequency that represents temporal changes in luminance;

computer-executable instructions for converting the corrected input image signal into the converted image signal having the second frame rate; and computer-executable instructions for outputting, when the frequency of the temporal changes in luminance of the input image signal exceeds a predetermined frequency of temporal changes in luminance that can be perceived by human eyes, the converted image signal having the second frame rate of which temporal changes in luminance are controlled so as to prevent the temporal changes in luminance of the converted image signal from being perceived by human eyes and for outputting, when the frequency of the temporal changes in luminance of the input image signal does not exceed the predetermined frequency of temporal changes in luminance that can be perceived by human eyes, the converted image signal having the second frame rate of which temporal changes in luminance can be perceived by human eyes.

* * * * *